United States Patent
Sha et al.

(10) Patent No.: US 11,864,155 B2
(45) Date of Patent: Jan. 2, 2024

(54) PAGING METHOD, BASE STATION, AND USER EQUIPMENT

(71) Applicant: ZTE CORPORATION, Guangdong (CN)

(72) Inventors: Xiubin Sha, Guangdong (CN); Bo Dai, Guangdong (CN); Ting Lu, Guangdong (CN); Xu Liu, Guangdong (CN)

(73) Assignee: ZTE Corporation, Guangdong (CN)

( * ) Notice: Subject to any disclaimer, the term of this patent is extended or adjusted under 35 U.S.C. 154(b) by 226 days.

(21) Appl. No.: 17/043,967

(22) PCT Filed: Mar. 14, 2019

(86) PCT No.: PCT/CN2019/078126
§ 371 (c)(1),
(2) Date: Sep. 30, 2020

(87) PCT Pub. No.: WO2019/192303
PCT Pub. Date: Oct. 10, 2019

(65) Prior Publication Data
US 2021/0058893 A1    Feb. 25, 2021

(30) Foreign Application Priority Data

Apr. 4, 2018   (CN) .......................... 201810299228.3

(51) Int. Cl.
*H04W 52/02*   (2009.01)
*H04W 68/00*   (2009.01)
(Continued)

(52) U.S. Cl.
CPC .......... *H04W 68/005* (2013.01); *H04W 4/80* (2018.02); *H04W 8/08* (2013.01);
(Continued)

(58) Field of Classification Search
CPC ....... H04W 68/005; H04W 4/80; H04W 8/08; H04W 52/0216; H04W 52/0235; H04W 52/0251
See application file for complete search history.

(56) References Cited

U.S. PATENT DOCUMENTS

2016/0100380 A1   4/2016   Jha et al.
2016/0270028 A1   9/2016   Lee et al.
(Continued)

FOREIGN PATENT DOCUMENTS

CN   102217396 A   10/2011
CN   104838709 A   8/2015
(Continued)

OTHER PUBLICATIONS

Notice of the First Examination Opinion for CN 201810299228.3, dated Jul. 19, 2021.
(Continued)

*Primary Examiner* — Jeffrey M Rutkowski
*Assistant Examiner* — Christopher Nguyen
(74) *Attorney, Agent, or Firm* — KDW Firm PLLC

(57) ABSTRACT

Provided are a paging method, base station, and user equipment (UE). The paging method includes that a base station configures a paging parameter according to a UE category. The paging parameter includes at least one of configuration information for scheduling paging or information about a downlink carrier for carrying paging.

12 Claims, 8 Drawing Sheets

101

A base station configures a paging parameter according to a UE category

(51) Int. Cl.
*H04W 4/70* (2018.01)
*H04L 5/00* (2006.01)
*H04W 4/80* (2018.01)
*H04W 8/08* (2009.01)

(52) U.S. Cl.
CPC ... *H04W 52/0216* (2013.01); *H04W 52/0235* (2013.01); *H04W 52/0251* (2013.01)

(56) References Cited

U.S. PATENT DOCUMENTS

| | | | |
|---|---|---|---|
| 2017/0019878 A1* | 1/2017 | Hu | H04W 76/10 |
| 2017/0064670 A1 | 3/2017 | Shen et al. | |
| 2017/0150477 A1* | 5/2017 | Du | H04W 72/23 |
| 2017/0244529 A1* | 8/2017 | Yu | H04W 72/23 |
| 2017/0272895 A1 | 9/2017 | Park et al. | |
| 2017/0311247 A1* | 10/2017 | Qi | H04W 48/18 |
| 2018/0070332 A1 | 3/2018 | Chen et al. | |
| 2018/0097541 A1* | 4/2018 | Bhattad | H04W 4/70 |
| 2018/0160407 A1* | 6/2018 | Wang | H04W 72/0453 |
| 2019/0215710 A1* | 7/2019 | Yi | H04L 1/0026 |

FOREIGN PATENT DOCUMENTS

| | | | |
|---|---|---|---|
| CN | 105101044 A | 11/2015 | |
| CN | 105191356 A | 12/2015 | |
| CN | 106465332 A | 2/2017 | |
| CN | 106465352 A | 2/2017 | |
| CN | 107534951 A | 1/2018 | |
| CN | 107637147 A | 1/2018 | |
| EP | 3219160 A1 | 9/2017 | |
| EP | 3281423 A1 | 2/2018 | |
| KR | 101537604 B1 | 7/2015 | |
| KR | 20150105602 A | 9/2015 | |
| RU | 2642333 C2 | 1/2018 | |
| WO | WO-2017173158 A1 * | 10/2017 | H04W 68/04 |
| WO | 2018031928 A1 | 2/2018 | |
| WO | WO-2018029375 A1 * | 2/2018 | H04L 5/0023 |

OTHER PUBLICATIONS

First Search Report for CN 201810299228.3, dated Jul. 19, 2021.
Substantive Examination Report for RU 2020135909/07(066128).
Huawei, HiSilicon, Wake Up Signal in NB-IoT and MTC, 3GPP TSG-RAN WG2 Meeting # 101 (R2-1802223) Athens, Greece.
Ericsson, Wake Up Signal in NB-IOoT and MTC, 3GPP TSGRAN2 Meeting # 101 (R2-1802586) Athens, Greece, Feb. 16, 2018, (found Jul. 19, 2021), found on the Internet https: //www .3gpp. org /DynaReport/TDocExMtg -R2-101-18770.htm, (L.1)) paging method (section2, pp. 1-4).
Office Action for the Korean Patent Application No. 10-2020-7031436, dated Jun. 29, 2021, 5 pages.
The Second Office Action for CN 201810299228.3, dated Jan. 11, 2022.
Supplemental Search Report for CN 201810299228.3, dated Jan. 11, 2022.
International Search Report for the PCT Application No. PCT/CN2019/078126, dated May 28, 2019, 2 pages.
European Search Report for the European Patent Application No. EP19781715, dated Dec. 1, 2021, 8 pages.
Second Office Action for the Russian Application No. 2020135909, dated Oct. 18, 2021, 8 pages.
First Indian Office Action for the Indian Patent Application No. 202027048053, dated Dec. 8, 2021, 7 pages.

* cited by examiner

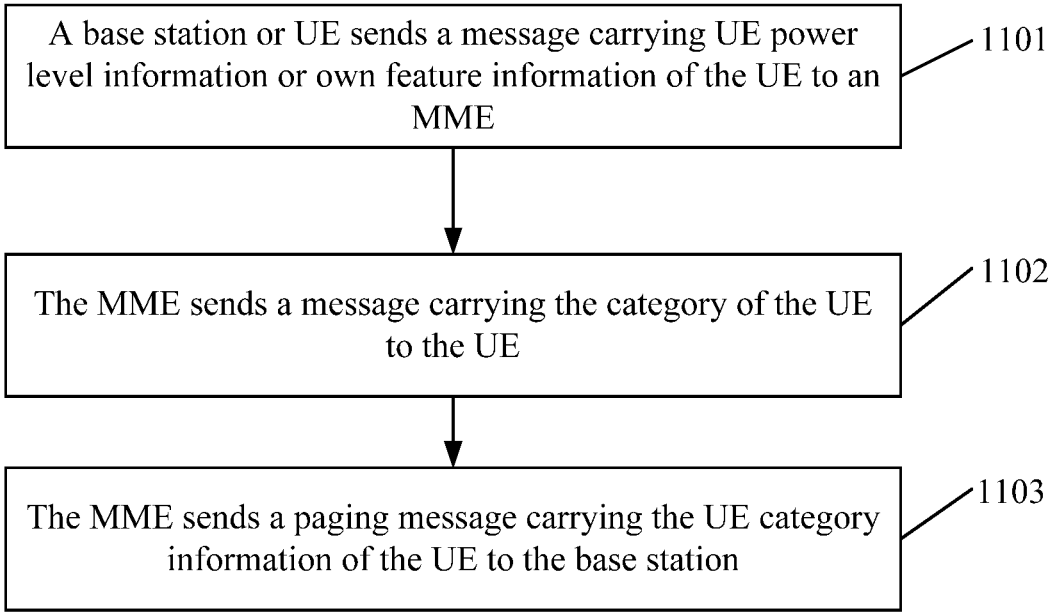
FIG. 10
FIG. 11
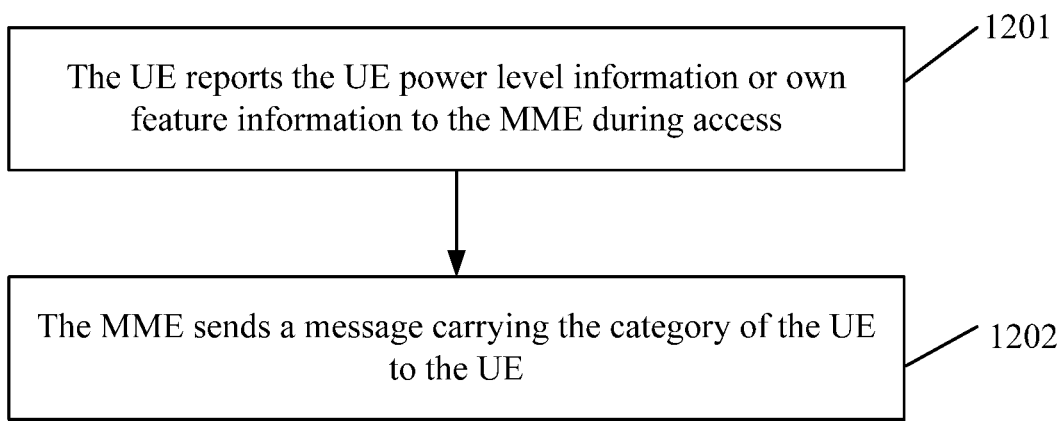
FIG. 12

PAGING METHOD, BASE STATION, AND USER EQUIPMENT

CROSS-REFERENCE TO RELATED APPLICATIONS

This is a National Stage Application, filed under 35 U.S.C. 371, of International Patent Application No. PCT/CN2019/078126, filed on Mar. 14, 2019, which is based on and claims priority to Chinese Patent Application No. 201810299228.3 filed at the CNIPA on Apr. 4, 2018, the disclosures of which are incorporated herein by reference in their entireties.

TECHNICAL FIELD

The present application relates to the Internet of Things (IoT) technology, for example, a paging method, a base station and a user equipment.

BACKGROUND

In the field of wireless communications, different radio access technologies are introduced for different communication requirements. For example, in the field of Internet of Things (IoT), the Long-Term Evolution (LTE, a standard developed by the 3rd Generation Partnership Project (3GPP) to serve as a long-term evolution for Universal Mobile Telecommunications System (UMTS)) radio access technology is evolved for IoT requirements, and Narrowband Internet of Things (NB-IoT) and enhanced Machine Type Communication (eMTC) technologies are introduced. NB-IoT and eMTC are both low-power wide-area network (LPWAN) technologies in 3GPP standards. Coverage enhancement and low power consumption are two important features of NB-IoT and eMTC.

In the current NB-IoT protocol, paging is scheduled through a narrowband physical downlink control channel (NPDCCH). To enhance the cell coverage area and paging coverage area, the NPDCCH for scheduling paging is repeatedly sent. The larger the coverage area, the more repetitions are required (the more repetitions, the more downlink NPDCCH resources are consumed). Additionally, the number of repetitions is broadcast to a user equipment (UE) through a system information block (SIB).

In the current eMTC protocol, coverage enhancement includes two modes: mode A and mode B, and eMTC terminals include two types: bandwidth-reduced low-complexity UEs (BL UEs) and UEs in CE. It is mandatory for BL UEs to support mode A. It is optional for UEs in CE to support mode A and mode B simultaneously. Paging mechanisms of BL UEs and UEs in CE are similar in that paging is scheduled through a machine type communication physical downlink control channel (MPDCCH). To enhance the cell coverage area and paging coverage area, the MPDCCH for scheduling paging is repeatedly sent. The larger the coverage area, the more repetitions are required (the more repetitions, the more downlink MPDCCH resources are consumed). Additionally, the number of repetitions is broadcast to a UE through a SIB.

Additionally, to reduce power consumption of a UE in monitoring paging, a wakeup signal is introduced to both NB-IoT and eMTC. In coverage enhancement scenarios, it is also necessary to repeatedly send the wakeup signal to increase the coverage area. The larger the coverage area, the more repetitions are required (the more repetitions, the more downlink wakeup signal resources are consumed).

Moreover, in current related protocols, the maximum number of repetitions of a PDCCH for scheduling paging and the maximum number of repetitions of a wakeup signal for scheduling paging are both configured according to the maximum cell coverage area. In this manner, for a UE having a small coverage area in a cell, the use of an excessively large number of repetitions not only wastes downlink resources, but also increases power consumption of the UE in monitoring paging.

Additionally, both NB-IoT UEs and eMTC UEs have requirements for low energy consumption and high requirements for energy saving. However, no energy saving solution is provided in the existing art to effectively improve the energy saving performance of a UE during paging.

SUMMARY

In view of this, an embodiment of the present application provides a paging method. The paging method includes that a base station configures a paging parameter according to a user equipment (UE) category. The paging parameter includes at least one of configuration information for scheduling paging or information about a downlink carrier for carrying paging.

Another embodiment of the present application provides a paging method. The paging method includes that a user equipment (UE) receives a paging parameter configured according to a UE category and sent by a base station.

The paging parameter includes at least one of: configuration information for scheduling paging or information about a downlink carrier for carrying paging.

Another embodiment of the present application provides a paging method. The paging method includes that a mobility management entity (MME) sends a paging message to a base station. The paging message carries UE category information of a to-be-paged UE.

The UE category information is used by the base station to identify the category of the to-be-paged UE.

The UE category information includes at least one of: UE power level information or UE category indication information.

Another embodiment of the present application provides a base station. The base station includes a configuration unit configured to configure a paging parameter according to a user equipment (UE) category.

The paging parameter includes at least one of: configuration information for scheduling paging or information about a downlink carrier for carrying paging.

Another embodiment of the present application provides a user equipment (UE). The UE includes a receiving unit configured to receive a paging parameter configured according to a UE category and sent by a base station.

The paging parameter includes at least one of configuration information for scheduling paging or information about a downlink carrier for carrying paging.

Another embodiment of the present application provides a mobility management entity (MME). The MME includes a sending unit configured to send a paging message to a base station. The he paging message carries UE category information of a to-be-paged UE.

The UE category information is used by the base station to identify the category of the UE.

The UE category information includes at least one of UE power level information or UE category indication information.

Another embodiment of the present application provides a base station. The base station includes a memory, a processor, and a computer program stored in the memory and executable by the processor. When the computer program is executed by the processor, any one of the preceding paging methods performed by the preceding base station is performed.

Another embodiment of the present application provides a user equipment (UE). The UE includes a memory, a processor, and a computer program stored in the memory and executable by the processor. When the computer program is executed by the processor, any one of the preceding paging methods performed by the preceding UE is performed.

Another embodiment of the present application provides a mobility management entity (MME). The MME includes a memory, a processor, and a computer program stored in the memory and executable by the processor. When the computer program is executed by the processor, any one of the preceding paging methods performed by the preceding MME is performed.

Another embodiment of the present application provides a computer-readable storage medium storing an information processing program. When the information processing program is executed by a processor, any one of the preceding paging methods is performed.

Other features and advantages of the present application are elaborated hereinafter in the description and partly become apparent from the description or understood through the implementation of the present application. The object and other advantages of the present application can be achieved and obtained through structures set forth in the description, claims and drawings.

BRIEF DESCRIPTION OF DRAWINGS

The drawings are used to provide a further understanding of the solution of the present application and constitute a part of the specification. In conjunction with embodiments of the present application, the drawings are intended to illustrate and not to limit the solution of the present application.

FIG. 10 is a flowchart of a paging method according to embodiment three of the present application.

FIG. 11 is a flowchart of a paging method according to example one in the embodiment three of the present application.

FIG. 12 is a schematic diagram illustrating the detailed process of steps 1001 and 1002 of example one in the embodiment three of the present application.

DETAILED DESCRIPTION

Figure 1:
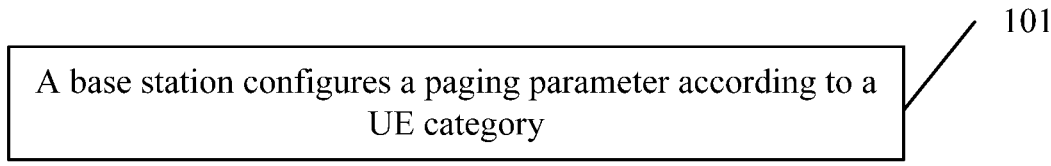
FIG. 1 is a flowchart of a paging method according to embodiment one of the present application.

Embodiments of the present application are described hereinafter in detail with reference to the drawings. It is to be noted that if not in collision, the embodiments described herein and the features thereof may be combined with each other.

The steps illustrated in the flowcharts among the drawings may be performed by, for example, a computer system capable of executing a set of computer-executable instructions. Moreover, although logical sequences are illustrated in the flowcharts, in some cases, the illustrated or described steps may be performed in sequences different from the sequences described herein.

The LTE radio access technology is evolved for IoT requirements, and NB-IoT and eMTC technologies are introduced. Coverage enhancement technology and low power technology are used by both NB-IoT and eMTC. In the current eMTC protocol, coverage enhancement includes two modes: mode A and mode B. During paging, to enhance the cell coverage area and paging coverage area, a PDCCH for scheduling paging is repeatedly sent. The larger the coverage area, the more repetitions are required (the more repetitions, the more downlink NPDCCH resources are consumed). Additionally, the number of repetitions is broadcast to a UE through a SIB. Additionally, to reduce power consumption of a UE in monitoring paging, a wakeup signal is introduced to both NB-IoT and eMTC. In coverage enhancement scenarios, it is also necessary to repeatedly send the wakeup signal to increase the coverage area. The larger the coverage area, the more repetitions are required (the more repetitions, the more downlink wakeup signal resources are consumed). Moreover, in current related protocols, the maximum number of repetitions of a PDCCH for scheduling paging and the maximum number of repetitions of a wakeup signal for scheduling paging are both configured according to the maximum cell coverage area. In this manner, for a UE (for example, an enhanced coverage restricted UE, a coverage enhancement mode B (CE-ModeB) restricted UE, or a UE having a low transmit power) having a small coverage area, the use of an excessively large number of repetitions not only wastes downlink resources, but also increases power consumption of the UE in monitoring paging. Additionally, both NB-IoT terminals and eMTC terminals have requirements for low energy consumption. Since the electric quantity of a UE having a low transmit power is small, requirements for energy saving of the UE having a low transmit power are high. As regards such energy saving, special paging parameters (such as a paging cycle, the number nB of paging resources in the paging cycle, and a paging carrier or narrowband) are required to be configured for the UE to reduce waste of downlink resources and improve the energy saving effect of the UE in monitoring paging.

In view of the preceding problem in the related art, embodiments of the present application provide a paging method, a base station and a user equipment. The paging method includes configuring a paging parameter according to a user equipment (UE) category. The paging parameter includes at least one of configuration information for scheduling paging or information about a downlink carrier for carrying paging. In this manner, different paging parameters are configured for different UE categories, that is, at least one of configuration information for scheduling paging or information about a downlink carrier for carrying paging is reasonably configured, thereby reducing waste of downlink resources, reducing power consumption of a UE in monitoring paging and improving the energy saving effect.

Embodiment One

FIG. 1 is a flowchart of a paging method according to embodiment one of the present application. As shown in FIG. 1, the method includes step 101.

In step 101, a base station configures a paging parameter according to a user equipment (UE) category.

The paging parameter includes at least one of configuration information for scheduling paging or information about a downlink carrier for carrying paging.

The paging method provided in this embodiment of the present application includes that a base station configures a paging parameter according to a UE category. The paging parameter includes at least one of configuration information for scheduling paging or information about a downlink carrier for carrying paging. In this manner, different paging parameters are configured for different UE categories, thereby reducing waste of downlink resources and reducing power consumption of a UE in monitoring paging.

The UE category includes at least one of an enhanced coverage restricted UE, a coverage enhancement mode B (CE-ModeB) restricted UE, a UE at a low power level, a mobility restricted UE, a UE at a particular coverage enhancement level, or another UE having a feature restricting the UE coverage area.

The UE category affects the size of the coverage area of the UE. UEs of different categories have coverage areas of different sizes. Generally, the coverage area of an enhanced coverage restricted UE<the coverage area of a CE-ModeB restricted UE<the coverage area of a UE at a low power level<the coverage area of a legacy UE. The enhanced coverage restricted UE refers to a UE that is not allowed to use the coverage enhancement function. The CE-ModeB restricted UE refers to a UE that is not allowed to use coverage enhancement mode B. The UE at a low power level refers to a UE that is introduced in an NB-IoT/eMTC system and has a maximum uplink transmit power of 14 dBm, a UE that is introduced later and has a maximum uplink transmit power less than a certain power threshold, or another UE that has a maximum uplink transmit power less than a certain power threshold in a radio technology in which wireless coverage is enhanced through repeated transmissions. The UE having a feature restricting the UE coverage area refer to a UE other than a coverage enhancement restricted UE, a CE-ModeB restricted UE and a UE at a low power level. The legacy UE refers to a UE whose coverage area is not restricted and whose paging parameter and selection policy of the paging parameter may be configured according to the maximum cell coverage area. The mobility restricted UE is a UE that is restricted in at least one of the moving speed or the moving range, such as a UE that does not move (that is, a stationary UE) or a UE that moves intermittently. In current related standards, at most three or four coverage enhancement levels can be set, and different coverage enhancement levels correspond to coverage areas of different sizes, that is, areas of different coverage degrees.

The configuration information for scheduling paging includes at least one of the maximum number of repetitions of a physical downlink control channel (PDCCH), the maximum number of repetitions of a wakeup signal for scheduling paging, the time-frequency position of the wakeup signal for scheduling paging, a paging cycle, or the number nB of paging resources in the paging cycle.

The information about the downlink carrier for carrying the paging includes at least one of: a list of carriers capable of carrying paging, a list of narrowbands capable of carrying paging, the UE selection weight of a paging carrier, the UE selection weight of a paging narrowband, the number of paging carriers, or the number of paging narrowbands.

The base station may configure a corresponding paging parameter for at least one UE category. For example, the base station performs at least one of the following configurations: (i) configuring a set of corresponding paging parameters for a coverage enhancement restricted UE, (ii) configuring a set of corresponding paging parameters for a CE-ModeB restricted UE, or (iii) configuring a set of corresponding paging parameters for a UE at a low power level, and broadcasting, through a SIB, the configured corresponding paging parameter of the at least one UE category and a correspondence between the at least one UE category and the paging parameter to all UEs served by the base station. A UE having a smaller coverage area may be allocated the smaller maximum number of repetitions of a PDCCH for scheduling paging and the smaller maximum number of repetitions of a wakeup signal for scheduling paging. For example, the maximum number of repetitions of a PDCCH for scheduling paging configured for an enhanced coverage restricted UE is less than the maximum number of repetitions of a PDCCH for scheduling paging configured for a CE-ModeB restricted UE and a UE at a low power level, and the maximum number of repetitions of a PDCCH for scheduling paging configured for a CE-ModeB restricted UE is less than the maximum number of repetitions of a PDCCH for scheduling paging configured for a UE at a low power level. It is also feasible to configure different UE categories with different paging parameters such as different paging cycles, different numbers nB of paging resources in the paging cycles, different lists of carriers capable of carrying paging, different lists of narrowbands capable of carrying paging, different UE selection weights of paging carriers, different UE selection weights of paging narrowbands, different numbers of paging carriers, or different numbers of paging narrowbands to facilitate subsequent selection of a paging resource according to the configured paging parameter, thereby reducing waste of downlink paging resources.

After the base station configures the paging parameter according to the UE category, the method further includes the step below.

The base station sends the paging parameter configured according to the UE category to the UE through a system information block (SIB).

For example, the base station may broadcast the paging parameter configured according to the UE category and a correspondence between the UE category and the paging parameter to the UE through the SIB.

After the base station configures the paging parameter according to the UE category, the method further includes the step below.

The base station selects a corresponding paging resource according to the category of a to-be-paged UE and the configured paging parameter and sends, on the paging resource, a paging message to the to-be-paged UE.

The base station selects the corresponding paging resource according to the category of the to-be-paged UE and the configured paging parameter in the manner below.

When the category of the to-be-paged UE is configured with the corresponding paging parameter, the base station selects the paging resource according to the corresponding paging parameter. Alternatively, when the category of the to-be-paged UE is not configured with the corresponding paging parameter, the base station selects the paging resource according to a paging parameter corresponding to a legacy UE or according to a paging parameter that is among the configured paging parameter and that corresponds to a UE category having a coverage area greater than or equal to a smallest coverage area among the UE category of the to-be-paged UE. The paging parameter corresponding to the legacy UE is configured according to the maximum cell coverage area.

When the category of the to-be-paged UE is configured with the corresponding paging parameter, the base station selects the paging resource according to the corresponding paging parameter in the manner below.

When the category of the to-be-paged UE includes only one category and the category of the to-be-paged UE is configured with the corresponding paging parameter, the base station selects the paging resource according to the corresponding paging parameter.

Alternatively, when the category of the to-be-paged UE includes a plurality of categories and one category is configured with the corresponding paging parameter, the base station selects the paging resource according to the corresponding paging parameter.

Alternatively, when the category of the to-be-paged UE includes a plurality of categories and multiple categories of the plurality of categories of the to-be-paged UE are configured with corresponding paging parameters, the base station selects paging resources by using one of the policies below.

Policy one: The base station selects the paging resource according to a paging parameter corresponding to a UE category having the smallest coverage area among the categories of the to-be-paged UE configured with the corresponding paging parameter.

Policy two: The base station selects the paging resource according to a paging parameter corresponding to a UE category having the smallest maximum number of repetitions of a PDCCH or the smallest maximum number of repetitions of a wakeup signal among the categories of the to-be-paged UE configured with the paging parameter.

Before the base station selects the paging resource according to the category of the to-be-paged UE and the configured paging parameter, the method further includes that the base station identifies, according to UE category information of the to-be-paged UE carried in a paging message sent by a mobility management entity (MME), the UE category of the to-be-paged UE. The UE category information includes at least one of UE power level information or UE category indication information.

The UE power level information includes UE maximum transmit power information. The UE category indication information includes the category of the to-be-paged UE.

The UE category includes at least one of an enhanced coverage restricted UE, a coverage enhancement mode B (CE-ModeB) restricted UE, a UE at a low power level, a mobility restricted UE, a UE at a particular coverage enhancement level, or another UE having a feature restricting the UE coverage area.

For example, when the MME initiates paging to the to-be-paged UE, the paging message sent to the base station carries the UE maximum transmit power information or UE category indication information of the to-be-paged UE. In this manner, the base station can identify the category of the UE according to the UE maximum transmit power information or UE category indication information of the to-be-paged UE. The UE power level information or UE category of the to-be-paged UE may be reported by the UE to the MME or sent by the UE to the MME through an eNB. Additionally, the category of the UE may also be a UE category subscribed in the MME.

The solution provided in embodiment one includes that a base station configures a paging parameter according to a UE category. The paging parameter includes at least one of configuration information for scheduling paging or information about a downlink carrier for carrying paging. In this manner, for UEs having coverage areas of different sizes, paging parameters are reasonably configured so that waste of downlink resources is reduced.

The solution provided in embodiment one is described in detail below through two examples. This embodiment may be applied to an eMTC or NB-IoT system. The base station (eNB) below may be an NB-IoT base station or an eMTC base station. The user equipment (UE) below may be an NB-IoT terminal or an eMTC terminal. The PDCCH below may be an NPDCCH or an MPDCCH.

Example One

Figure 2:
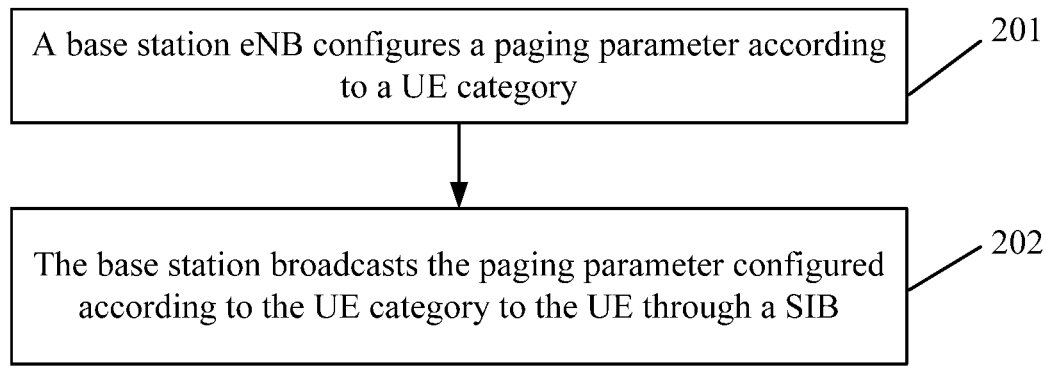
FIG. 2 is a flowchart of a paging method according to example one in the embodiment one of the present application.

FIG. 2 is a flowchart of a paging method according to example one in the embodiment one of the present application. As shown in FIG. 2, the method includes steps 201 and 202.

In step 201, a base station eNB configures a paging parameter according to a UE category.

The paging parameter includes at least one of: configuration information for scheduling paging or information about a downlink carrier for carrying paging.

The UE category includes at least one of: an enhanced coverage restricted UE, a coverage enhancement mode B (CE-ModeB) restricted UE, a UE at a low power level, a mobility restricted UE, a UE at a particular coverage enhancement level, or another UE having a feature restricting the UE coverage area.

The configuration information for scheduling paging includes at least one of: the maximum number of repetitions of a physical downlink control channel (PDCCH), the maximum number of repetitions of a wakeup signal for scheduling paging, the time-frequency position of the wakeup signal for scheduling paging, a paging cycle, or the number nB of paging resources in the paging cycle.

The information about the downlink carrier for carrying the paging includes at least one of: a list of carriers capable of carrying paging, a list of narrowbands capable of carrying paging, the UE selection weight of a paging carrier, the UE selection weight of a paging narrowband, the number of paging carriers, or the number of paging narrowbands.

Different UE categories correspond to different coverage areas. Generally, the coverage area of an enhanced coverage restricted UE enhanced coverage restricted UE<the coverage area of a CE-ModeB restricted UE<the coverage area of a UE at a low power level<the coverage area of a legacy UE. In this manner, the base station can configure different UE categories with at least one of: different maximum numbers of repetitions of a PDCCH for scheduling paging and different maximum numbers of repetitions of a wakeup signal for scheduling paging. In this manner, for a UE having a restricted coverage area, it is not required to configure at least one of: the maximum number of repetitions of a PDCCH for scheduling paging or the maximum number of repetitions of a wakeup signal for scheduling paging according to the maximum cell coverage area. Moreover, a UE having a smaller coverage area is allocated the smaller maximum number of repetitions of a PDCCH for scheduling paging and the smaller maximum number of repetitions of a wakeup signal for scheduling paging. Thus, waste of downlink resources is avoided.

Additionally, at least one of the maximum number of repetitions of a PDCCH for scheduling paging or the maximum number of repetitions of a wakeup signal for scheduling paging may be fixed at 1 (not repeatedly sent) according to a standard.

Similarly, the base station may configure different UE categories with different paging parameters such as different paging cycles, different numbers nB of paging resources in the paging cycles, different lists of carriers or narrowbands capable of carrying paging, different UE selection weights of paging carriers or narrowbands, or different numbers of paging carriers or narrowbands. For example, both NB-IoT terminals and eMTC terminals have requirements for low energy consumption and low power. Since the battery capacity of a UE having a low transmit power is small, requirements for energy saving of the UE having a low transmit power are high. As regards such energy saving, special paging parameters may be configured according to the UE category. For example, a paging parameter such as a special paging cycle (for example, a paging DRX cycle), the special number nB of paging resources in the paging cycle, a dedicated carrier, or a dedicated paging narrowband are configured for a certain UE category.

The base station may configure each UE category of all UE categories with a set of paging parameters or configure each UE category of one or more UE categories with a set of paging parameters; and form a relationship table for a comparison between UE categories and paging parameters, save the table locally and broadcast the table to all UEs served by the base station. In step 202, the base station broadcasts the paging parameter configured according to the UE category to the UE through a system information block (SIB).

After configuring the paging parameter, the base station may broadcast the configured paging parameter as a correspondence between UE categories and paging parameters through the SIB to all UEs served by the base station. After receiving the paging parameter configured by the base station according to the UE category, the UE saves the configured paging parameter locally. In this manner, the paging parameter configured by the base station according to the UE category is saved by both the UE and the base station.

Moreover, the base station further includes one of the following: the base station configures a particular UE category with the special maximum number of repetitions of a PDCCH for scheduling paging and the special maximum number of repetitions of a wakeup signal for scheduling paging and broadcasts the configured special maximum number of repetitions of a PDCCH for scheduling paging and the configured special maximum number of repetitions of a wakeup signal for scheduling paging through the SIB to all UEs served by the base station. During subsequent paging, whether or not the paging parameter configured by the base station locally according to the UE category includes at least one of the maximum number of repetitions of a PDCCH for scheduling paging or the maximum number of repetitions of a wakeup signal for scheduling paging corresponding to the particular UE category, if at least one of the special maximum number of repetitions of a PDCCH for scheduling paging or the special maximum number of repetitions of a wakeup signal for scheduling paging is configured for the particular UE category, the paging resource is selected preferentially according to at least one of the special maximum number of repetitions of a PDCCH for scheduling paging or the special maximum number of repetitions of a wakeup signal for scheduling paging. Similarly, whether or not the paging parameter configured by the base station according to the UE category and received by a to-be-paged UE includes at least one of the maximum number of repetitions of a PDCCH for scheduling paging or the maximum number of repetitions of a wakeup signal for scheduling paging corresponding to the particular UE category, if the to-be-paged UE receives at least one of the special maximum number of repetitions of a PDCCH for scheduling paging or the special maximum number of repetitions of a wakeup signal for scheduling paging that is configured for the particular UE category by the base station, the to-be-paged UE selects the paging resource preferentially according to at least one of the special maximum number of repetitions of a PDCCH for scheduling paging or the special maximum number of repetitions of a wakeup signal for scheduling paging.

In the solution provided in this example one, the base station configures the paging parameter according to the UE category and sends the paging parameter to the UE. In this manner, different paging parameters are reasonably configured for different UE categories.

Example Two

Figure 3:
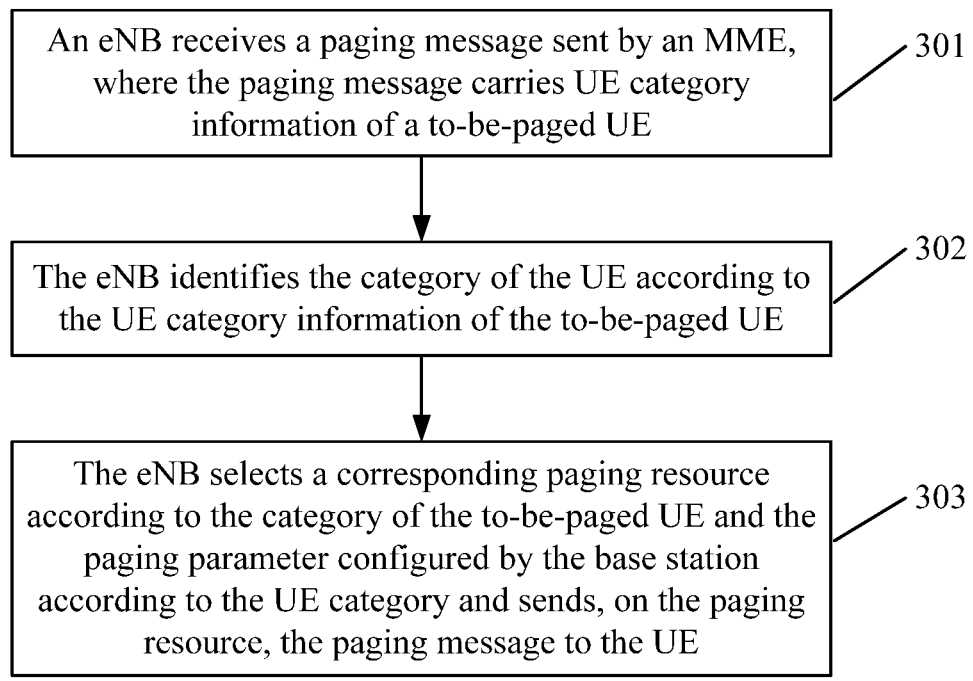
FIG. 3 is a flowchart of a paging method according to example two in the embodiment one of the present application.

FIG. 3 is a flowchart of a paging method according to example two in the embodiment one of the present application. As shown in FIG. 3, the method includes steps 301, 302 and 303.

In step 301, an eNB receives a paging message sent by a mobility management entity (MME). The paging message carries UE category information of a to-be-paged UE.

The UE category information is used by the base station to identify the category of the UE. The UE category information includes at least one of: UE power level information or UE category indication information.

The UE power level information includes UE maximum transmit power information. The UE category indication information includes the category of the UE. The category of the to-be-paged UE includes at least one of: an enhanced coverage restricted UE, a coverage enhancement mode B (CE-ModeB) restricted UE, a UE at a low power level, a mobility restricted UE, a UE at a particular coverage enhancement level, or another UE having a feature restricting the UE coverage area.

For example, when the MME initiates paging to the to-be-paged UE, the paging message sent to the base station carries the UE maximum transmit power information or UE category indication information of the to-be-paged UE. In this manner, the base station can identify the category of the to-be-paged UE according to the UE maximum transmit power information or UE category indication information of the to-be-paged UE. The UE power level information or UE category of the UE may be reported by the UE to the MME or sent by the UE to the MME through an eNB. The category of the to-be-paged UE may also be a UE category subscribed in the MME.

In step 302, the eNB identifies the category of the UE according to the UE category information of the to-be-paged UE.

For example, if the UE power level information includes UE maximum transmit power information and the maximum uplink transmit power of the to-be-paged UE is 14 dBm, the eNB can identify the UE category of the to-be-paged UE as a UE at a low power level.

For example, if the UE category indication information of the to-be-paged UE indicates that the category of the UE is at least one of an enhanced coverage restricted UE or a CE-ModeB restricted UE, the eNB can identify the category of the UE as at least one of an enhanced coverage restricted UE or a CE-ModeB restricted UE.

For example, if the UE category indication information of the to-be-paged UE indicates that the category of the UE is at least one of an enhanced coverage restricted UE, a CE-ModeB restricted UE or a UE at a low power level, the eNB can identify the category of the to-be-paged UE as at least one of an enhanced coverage restricted UE, a CE-ModeB restricted UE or a UE at a low power level.

For example, if the UE category of the to-be-paged UE is indicated as a mobility restricted (for example, stationary) UE and the coverage enhancement level of the UE is indicated, the eNB can identify the coverage enhancement level of the to-be-paged UE.

For example, if the UE category indication information of the to-be-paged UE indicates that the category of the UE is an enhanced coverage restricted UE, the eNB can identify the coverage enhancement level of the UE as coverage enhancement level 0.

For example, if the UE category indication information of the to-be-paged UE indicates that the category of the UE is a CE-ModeB restricted UE, the eNB can identify the coverage enhancement mode of the UE as coverage enhancement mode A (that is, the UE can be in only coverage enhancement mode 0 or coverage enhancement mode 1).

In step 303, the eNB selects a corresponding paging resource according to the category of the to-be-paged UE and the paging parameter configured by the base station according to the UE category and sends, on the paging resource, the paging message to the UE.

For details about how the base station configures the paging parameter according to the UE category, see the preceding example one. The details are not repeated here.

One UE may have one or more UE categories.

When the category of the to-be-paged UE includes only one category and the category of the to-be-paged UE is configured with the corresponding paging parameter, the base station selects the paging resource according to the corresponding paging parameter. For example, if the UE category of the UE is a UE at a low power level and the base station also has a paging parameter configured according to the UE at a low power level, then the category of the to-be-paged UE is configured with a corresponding paging parameter. In this case, a corresponding paging resource is selected according to the paging parameter corresponding to the UE at a low power level and the paging message is sent on the paging resource to the to-be-paged UE.

When the category of the to-be-paged UE includes a plurality of categories and one category is configured with the corresponding paging parameter, the base station selects the paging resource according to the corresponding paging parameter. For example, if the category of the to-be-paged UE includes a UE at a low power level and an enhanced coverage restricted UE, but the base station has only a paging parameter configured according to the UE at a low power level, then one of the two categories of the to-be-paged UE is configured with a corresponding paging parameter. In this case, a corresponding paging resource is selected according to the paging parameter corresponding to the UE at a low power level and the paging message is sent on the paging resource to the UE.

When the category of the to-be-paged UE includes a plurality of categories and multiple categories of the plurality of categories of the to-be-paged UE are configured with corresponding paging parameters, the base station selects paging resources by using policy one or policy two below.

Policy one: The base station selects the paging resource according to a paging parameter corresponding to a UE category having the smallest coverage area among the categories of the to-be-paged UE configured with the corresponding paging parameter.

Policy two: The base station selects the paging resource according to a paging parameter corresponding to a UE category having the smallest maximum number of repetitions of a PDCCH or the smallest maximum number of repetitions of a wakeup signal among the categories of the to-be-paged UE configured with the paging parameter.

For example, if the category of the to-be-paged UE includes a UE at a low power level and a enhanced coverage restricted UE, and the base station configures a paging parameter for the UE at a low power level and the enhanced coverage restricted UE separately, then the two categories of the to-be-paged UE are each configured with a corresponding paging parameter. In this case, since the coverage area of the enhanced coverage restricted UE<the coverage area of the UE at a low power level, a corresponding paging resource is selected according to the paging parameter corresponding to the enhanced coverage restricted UE and the paging message is sent on the paging resource to the UE.

When the category of the UE to be paged is not configured with the corresponding paging parameter, the UE selects the paging resource according to a paging parameter corresponding to a legacy UE or according to a paging parameter that is among the configured paging parameter and that corresponds to a coverage area greater than or equal to a paging parameter corresponding to the UE category of the UE to be paged. The paging parameter corresponding to the legacy UE is configured according to the maximum cell coverage area.

For example, if the category of the to-be-paged UE includes a UE at a low power level and an enhanced coverage restricted UE, but the base station configures a corresponding paging parameter according to only a CE-ModeB restricted UE, then no corresponding paging parameter is configured for the UE category of the to-be-paged UE and a paging parameter corresponding to a legacy UE may be selected.

For example, if the category of the to-be-paged UE includes an enhanced coverage restricted UE and a CE-ModeB restricted UE, but the base station configures a corresponding paging parameter according to only a UE at a low power level, then no corresponding paging parameter is configured for the UE category of the to-be-paged UE and a paging parameter corresponding to a legacy UE may be selected. Additionally, since the coverage area of an enhanced coverage restricted UE<the coverage area of a CE-ModeB restricted UE<the coverage area of a UE at a low power level, it is also feasible to select a corresponding paging resource according to a paging parameter corresponding to the UE at a low power level or preferentially select a corresponding paging resource according to a paging parameter corresponding to the UE at a low power level. Additionally, at least one of the maximum number of repetitions of a PDCCH for scheduling paging or the maximum number of repetitions of a wakeup signal for scheduling paging may be fixed at 1 (not repeatedly sent) according to a standard. If the standard is fixed at 1, at least one of the maximum number of repetitions of a PDCCH for scheduling paging or the maximum number of repetitions of a wakeup signal for scheduling paging is fixed at 1 and is not selected from the paging parameter configured by the base station according to the UE category and the legacy parameter.

In the solution provided in this example two, during paging, the base station can select a corresponding paging resource according to the category of a to-be-paged UE and a paging parameter configured according to the UE category and sends, on the paging resource, a paging message to the to-be-paged UE. In this manner, different paging parameters are configured for different UE categories, thereby avoiding waste of downlink resources and achieving paging optimization.

Embodiment Two

Figure 4:
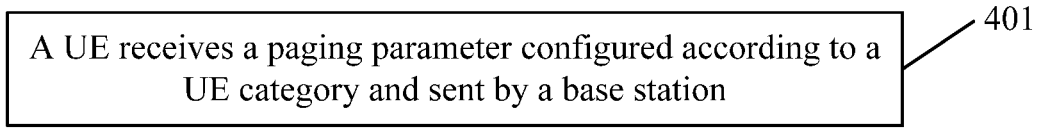
FIG. 4 is a flowchart of a paging method according to embodiment two of the present application.

FIG. 4 is a flowchart of a paging method according to embodiment two of the present application. As shown in FIG. 4, the method includes step 401.

In step 401, a user equipment (UE) receives a paging parameter configured according to a UE category and sent by a base station.

The paging parameter includes at least one of configuration information for scheduling paging or information about a downlink carrier for carrying paging.

For details about how the base station configures the paging parameter according to the UE category, see embodiment one. The details are not repeated here.

The UE category includes at least one of an enhanced coverage restricted UE, a coverage enhancement mode B (CE-ModeB) restricted UE, a UE at a low power level, a mobility restricted UE, a UE at a particular coverage enhancement level, or another UE having a feature restricting the UE coverage area.

The configuration information for scheduling paging includes at least one of: the maximum number of repetitions of a physical downlink control channel (PDCCH), the maximum number of repetitions of a wakeup signal for scheduling paging, the time-frequency position of the wakeup signal for scheduling paging, a paging cycle, or the number nB of paging resources in the paging cycle.

The information about a downlink carrier for carrying paging includes at least one of: a list of carriers capable of carrying paging, a list of narrowbands capable of carrying paging, the UE selection weight of a paging carrier, the UE selection weight of a paging narrowband, the number of paging carriers, or the number of paging narrowbands.

After the UE receives the paging parameter configured according to the UE category and sent by the base station, the method further includes that the UE selects a paging resource according to the category of the UE and the received paging parameter and monitors, on the paging resource, a paging message.

The UE selects the paging resource according to the category of the UE and the received paging parameter in the manner below.

When the category of the UE is configured with the corresponding paging parameter, the UE selects the paging resource according to the corresponding paging parameter.

Alternatively, when the category of the UE is not configured with the corresponding paging parameter, the UE selects the paging resource according to a paging parameter corresponding to a legacy UE or according to a paging parameter that is among the configured paging parameter and that corresponds to a UE category having a coverage area greater than or equal to a smallest coverage area among the category of the UE. The paging parameter corresponding to the legacy UE is configured according to the maximum cell coverage area.

When the category of the to-be-paged UE is configured with the corresponding paging parameter, the UE selects the paging resource according to the corresponding paging parameter in the manner below.

When the category of the UE includes only one category and the category of the UE is configured with the corresponding paging parameter, the UE selects the paging resource according to the corresponding paging parameter.

When the category of the UE includes a plurality of categories and one category is configured with the corresponding paging parameter, the UE selects the paging resource according to the corresponding paging parameter.

Alternatively, when the category of the UE includes a plurality of categories and multiple categories of the plurality of categories of the UE are configured with corresponding paging parameters, the UE selects paging resources by using one of the policies below.

Policy one: The UE selects the paging resource according to a paging parameter corresponding to a UE category having the smallest coverage area among the categories of the UE configured with the corresponding paging parameter.

Policy two: The UE selects the paging resource according to a paging parameter corresponding to a UE category having the smallest maximum number of repetitions of a PDCCH or the smallest maximum number of repetitions of a wakeup signal among the categories of the UE configured with the paging parameter.

When the category of the to-be-paged UE is configured with the corresponding paging parameter, the UE selects the paging resource according to the corresponding paging parameter in the manner below.

When the category of the UE includes a plurality of categories and these categories of the UE are configured with corresponding paging parameters, the UE selects paging resources by using one of the policies below.

Policy one: The UE selects the paging resource according to a paging parameter corresponding to a UE category having the smallest coverage area among the categories of the UE configured with the corresponding paging parameter.

Policy two: The UE selects the paging resource according to a paging parameter corresponding to a UE category having the smallest maximum number of repetitions of a PDCCH or the smallest maximum number of repetitions of a wakeup signal among the categories of the UE configured with the paging parameter.

Policy three: The UE selects at least two sets of paging parameters in one-to-one correspondence with at least two categories of the UE configured with the paging parameter, selects at least two sets of paging resources in one-to-one correspondence with the at least two sets of paging parameters, and monitors the paging message on the at least two sets of paging resources simultaneously.

The UE selects the paging resource according to the corresponding paging parameter in the manner below.

If a parameter item is configured in the paging parameter, the UE selects the paging resource according to the configured parameter item.

If no parameter item is configured in the paging parameter, the UE selects the paging resource according to a parameter item corresponding to a legacy UE. The parameter item corresponding to the legacy UE is configured according to the maximum cell coverage area.

The parameter item includes at least one of the maximum number of repetitions of a PDCCH for scheduling paging, the maximum number of repetitions of a wakeup signal for scheduling paging, the time-frequency position of the wakeup signal for scheduling paging, a paging cycle, or the number nB of paging resources in the paging cycle.

The UE selects the paging resource according to the corresponding paging parameter in the following manner: If the paging parameter includes a paging-carriable carrier or narrowband corresponding to the category of the UE, the UE selects the paging resource according to one of the policies below.

Policy one: If the carrier or narrowband includes only one carrier or narrowband, the UE selects the paging resource according to the carrier or narrowband.

Policy two: If the carrier or narrowband includes a plurality of carriers or narrowbands, the UE selects one carrier of the plurality of carriers or one narrowband of the plurality of narrowbands according to one of the predefined rules below and selects the paging resource according to the one carrier or the one narrowband.

Rule one: The UE is allocated to the carriers or narrowbands in proportion to a selection weight according to (i) a UE ID and a carrier selection weight or (ii) the UE ID and a narrowband selection weight.

Rule two: The UE is evenly allocated to the carriers or narrowbands after a modulus operation is performed on the UE ID and the number of the carriers or narrowbands.

As regards how to select one carrier or narrowband from these carriers or narrowbands in the manner of proportional allocation or in the manner of modulus operation, a related solution in a related standard may be used. The details are not repeated here.

The UE selects the paging resource according to the corresponding paging parameter in the following manner: If the corresponding paging parameter does not include a paging-carriable carrier or narrowband corresponding to the category of the UE, the UE selects a carrier or narrowband from a paging carrier or narrowband of the legacy UE according to a paging carrier or narrowband selection policy of the legacy UE and selects the paging resource according to the selected carrier or narrowband. The paging carrier or narrowband of the legacy UE is configured according to the maximum cell coverage area and the paging carrier or narrowband selection policy of the legacy UE is configured according to the maximum cell coverage area.

Before the UE selects the corresponding paging resource according to the category of the UE and the received paging parameter, the method further includes that the UE identifies the category of the UE according to UE power level information or own feature information of the UE or identifies the category of the UE according to a UE category carried in a message present by a mobility management entity (MME). The own feature information refers to whether coverage enhancement mode B (CE-ModeB) of the UE is restricted, and if the CE-ModeB of the UE is restricted, the category of the UE includes a CE-ModeB restricted UE.

For example, in one case, the UE may identify its own category according to the UE power level information (for example, UE maximum transmit power) of the UE or the own feature information (for example, whether the parameter "UE's usage setting" of the UE is set to "voice centric" (for example, if the parameter "UE's usage setting" of the UE is set to "voice centric", CE-ModeB of the UE is restricted)) of the UE; in another case, the UE may identify its own category according to the UE category carried in the message present by the MME, that is, the MME notifies the UE category (for example, enhanced coverage restricted UE) subscribed in the MME to the UE.

For example, the MME may carry the UE category in the ATTACH REQUES message or the TRACKING AREA UPDATE REQUEST message sent to the UE. The category of the UE may also be a UE category subscribed in the MME.

In the solution provided in this example two, the UE receives the paging parameter configured by the base station according to the UE category and then during paging, the UE selects a paging resource according to the category of the UE and the received paging parameter and monitors, on the paging resource, a paging message. In this manner, UEs of different categories select paging resources according to different paging parameters, thereby reducing power consumption while the UE is monitoring paging, improving the effect of energy saving and achieving paging optimization.

The solution provided in embodiment two is described in detail below through five examples. This embodiment is applicable to an eMTC or NB-IoT system. The base station (eNB) below may be an NB-IoT base station or an eMTC base station. The user equipment (UE) below may be an NB-IoT terminal or an eMTC terminal. The PDCCH below may be an NPDCCH or an MPDCCH.

Example One

Figure 5:
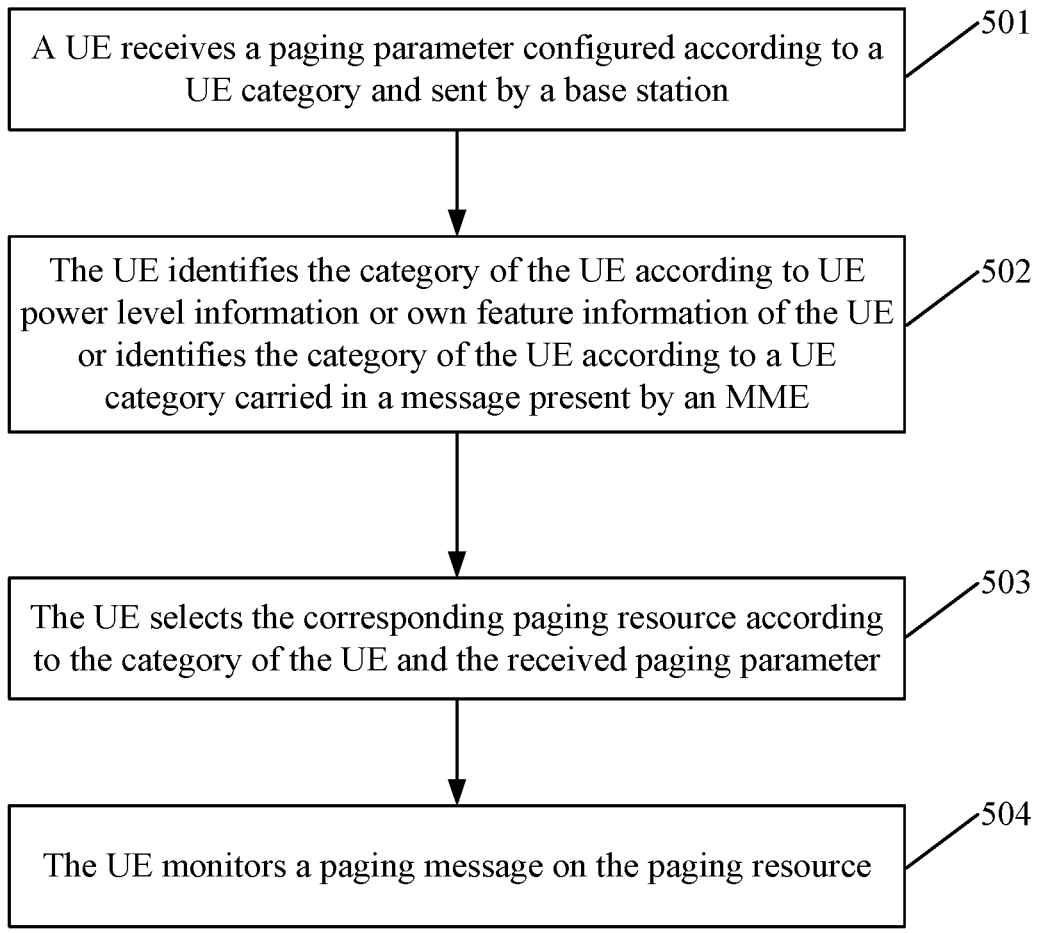
FIG. 5 is a flowchart of a paging method according to example one in the embodiment two of the present application.

FIG. 5 is a flowchart of a paging method according to example one in the embodiment two of the present application. As shown in FIG. 5, the method includes steps 501 through 504.

In step 501, a user equipment (UE) receives a paging parameter configured according to a UE category and sent by a base station.

The paging parameter includes at least one of: configuration information for scheduling paging or information about a downlink carrier for carrying paging.

For details about how the base station configures the paging parameter according to the UE category, see embodiment one. The details are not repeated here.

The UE category includes at least one of: an enhanced coverage restricted UE, a coverage enhancement mode B (CE-ModeB) restricted UE, a UE at a low power level, a mobility restricted UE, a UE at a particular coverage enhancement level, or another UE having a feature restricting the UE coverage area.

The configuration information for scheduling paging includes at least one of the maximum number of repetitions of a physical downlink control channel (PDCCH), the maximum number of repetitions of a wakeup signal for scheduling paging, the time-frequency position of the wakeup signal for scheduling paging, a paging cycle, or the number nB of paging resources in the paging cycle.

The information about a downlink carrier for carrying paging includes at least one of: a list of carriers capable of carrying paging, a list of narrowbands capable of carrying paging, the UE selection weight of a paging carrier, the UE selection weight of a paging narrowband, the number of paging carriers, or the number of paging narrowbands.

In step 502, the UE identifies the category of the UE according to UE power level information or own feature information of the UE or identifies the category of the UE according to a UE category carried in a message present by a mobility management entity (MME).

For example, the MME may carry UE category indication information of the UE in the ATTACH ACCEPT message or the TRACKING AREA UPDATE ACCEPT message sent to the UE. The category of the UE may also be a UE category subscribed in the MME.

The sequence of step 501 and step 502 is not fixed and is not limited by this example one provided for ease of illustration only.

In step 503, the UE selects the corresponding paging resource according to the category of the UE and the received paging parameter.

The UE selects the paging resource according to the category of the UE and the received paging parameter in the following manner: the UE receives a message sent by the MME, where the message carries the category of the UE.

In step 504, the UE monitors a paging message on the paging resource. In the solution provided in this example one, the UE receives the paging parameter configured by the base station according to the UE category and then during paging, the UE selects a paging resource according to the category of the UE and the received paging parameter and monitors, on the paging resource, a paging message. In this manner, UEs of different categories select paging resources according to different paging parameters, thereby reducing power consumption while the UE is monitoring paging and improving the effect of energy saving.

Example Two

Figure 6:
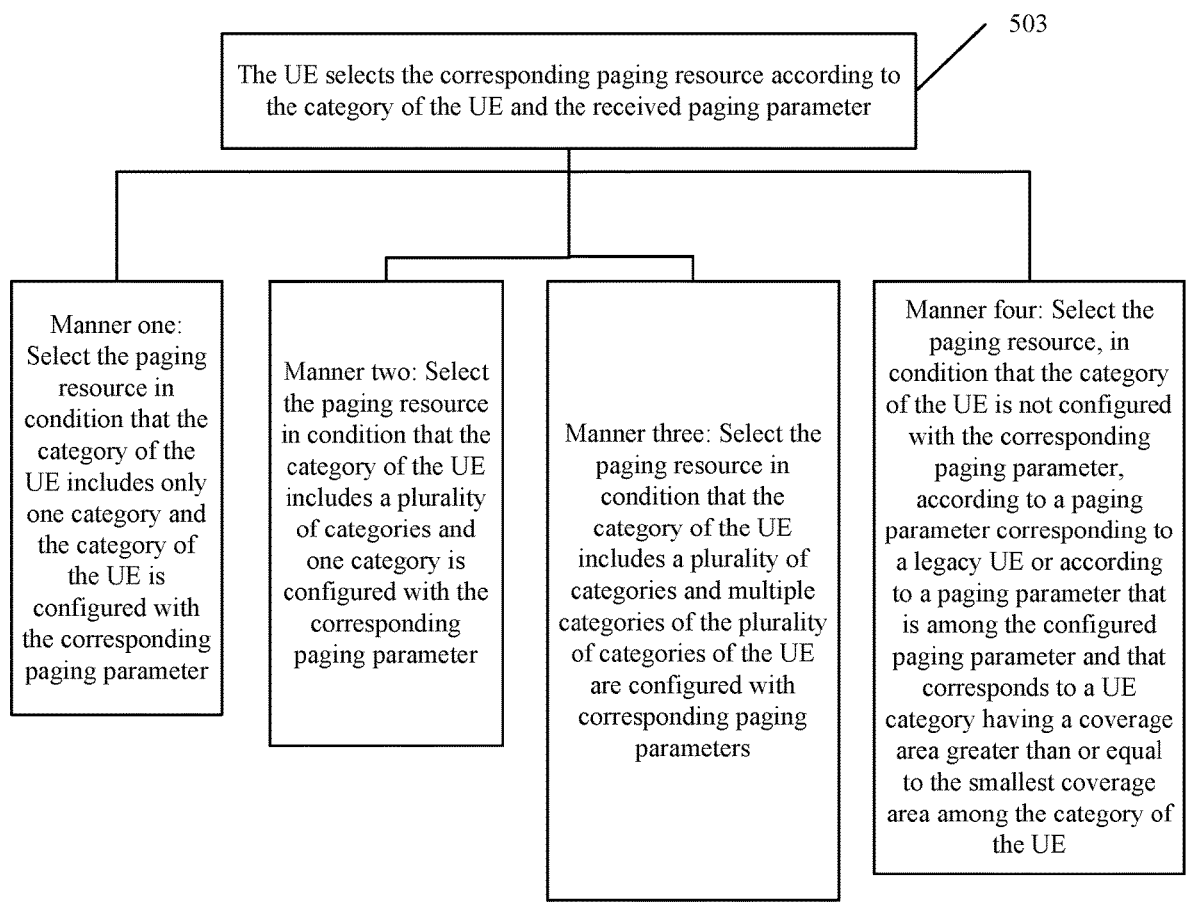
FIG. 6 is a schematic diagram illustrating the detailed process of step 503 of example one in the embodiment two of the present application.

FIG. 6 is a schematic diagram illustrating the detailed process of step 503 of example one in the embodiment two of the present application. As shown in FIG. 6, step 503 is performed in the four manners below.

Manner one: When the category of the UE includes only one category and the category of the UE is configured with the corresponding paging parameter, the UE selects the paging resource according to the corresponding paging parameter.

For example, if the category of the UE is a UE at a low power level and the base station also has a paging parameter configured according to the UE at a low power level, then the category of the UE is consistent with the UE category corresponding to a set of paging parameters in the received paging parameters and the category of the UE is configured with a corresponding paging parameter. In this case, a corresponding paging resource is selected according to the paging parameter corresponding to the UE at a low power level and the paging message is sent on the paging resource to the UE.

Manner two: When the category of the UE includes a plurality of categories and one category is configured with the corresponding paging parameter, the UE selects the paging resource according to the corresponding paging parameter.

For example, if the category of the UE includes a UE at a low power level and a enhanced coverage restricted UE, but the base station has a paging parameter configured according to only the UE at a low power level, then one of the two categories of the UE is consistent with the UE category corresponding to the received paging parameters and one of the multiple categories of the UE is configured with a corresponding paging parameter. In this case, a corresponding paging resource is selected according to the paging parameter corresponding to the UE at a low power level and the paging message is monitored on the paging resource.

Manner three: When the category of the UE includes a plurality of categories and multiple categories of the plurality of categories of the UE are configured with corresponding paging parameters, the UE selects paging resources by using the policy one or two below.

Policy one: The UE selects the paging resource according to a paging parameter corresponding to a UE category having the smallest coverage area among the categories of the UE configured with the corresponding paging parameter.

Policy two: The UE selects the paging resource according to a paging parameter corresponding to a UE category having the smallest maximum number of repetitions of a PDCCH or the smallest maximum number of repetitions of a wakeup signal among the categories of the UE configured with the paging parameter.

For example, if the category of the UE includes a UE at a low power level and a enhanced coverage restricted UE, and the base station configures a paging parameter for the UE at a low power level and the enhanced coverage restricted UE separately, then the two categories of the UE are each consistent with the UE category corresponding to the respective one of two sets of paging parameters in the received paging parameters and multiple categories of the UE are each configured with a corresponding paging parameter. In this case, since the coverage area of the enhanced coverage restricted UE<the coverage area of the UE at a low power level, a corresponding paging resource can be selected, according to policy one, according to the paging parameter corresponding to the enhanced coverage restricted UE and the paging message is monitored on the paging resource.

Manner four: When the category of the UE is not configured with the corresponding paging parameter, the UE selects the paging resource according to a paging parameter corresponding to a legacy UE or according to a paging parameter that is among the configured paging parameter and that corresponds to a coverage area greater than or equal to a paging parameter corresponding to a UE category having the smallest coverage area among the category of the UE. The paging parameter corresponding to the legacy UE is configured according to the maximum cell coverage area.

For example, if the category of the UE is a UE at a low power level or a enhanced coverage restricted UE, but the UE receives a corresponding paging parameter configured by the base station according to only a CE-ModeB restricted UE, then the category of the UE does not correspond to the UE category of the received paging parameters, that is, no corresponding paging parameter is configured for the UE category of the UE, and a paging parameter corresponding to a legacy UE may be selected.

For example, if the category of the UE is an enhanced coverage restricted UE or a CE-ModeB restricted UE, but the UE receives a set of paging parameters configured by the base station according to only a UE at a low power level, then the category of the UE does not correspond to the UE category of the received paging parameters, that is, no corresponding paging parameter is configured for the category of the UE, and a paging parameter corresponding to a legacy UE may be selected. Additionally, since the coverage area of an enhanced coverage restricted UE<the coverage area of a CE-ModeB restricted UE<the coverage area of a UE at a low power level, it is also feasible to select a corresponding paging resource according to a paging parameter corresponding to the UE at a low power level or preferentially select a corresponding paging resource according to a paging parameter corresponding to the UE at a low power level.

In this example two, while paging is being monitored, the UE selects a corresponding paging resource according to the category of the UE and parameter information configured by the base station according to the UE category and received from the base station. In this manner, UEs of different categories select paging resources according to different paging parameters, thereby reducing power consumption while the UE is monitoring paging and improving the effect of energy saving.

Example Three

Figure 7:
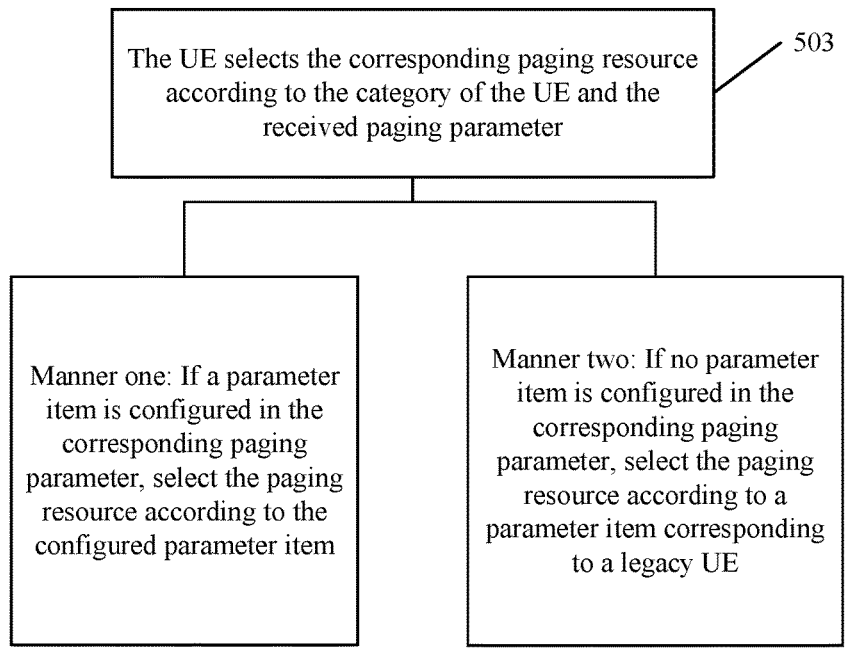
FIG. 7 is a schematic diagram illustrating the detailed process of step 503 of example one in the embodiment two of the present application.

FIG. 7 is a schematic diagram illustrating the detailed process of step 503 of example one in the embodiment two of the present application. As shown in FIG. 7, step 503 includes the manner one and manner two below.

Manner one: If a parameter item is configured in the corresponding paging parameter, the UE selects the paging resource according to the configured parameter item.

Manner two: If no parameter item is configured in the corresponding paging parameter, the UE selects the paging resource according to a parameter item corresponding to a legacy UE. The parameter item corresponding to the legacy UE is configured according to the maximum cell coverage area.

The parameter item includes at least one of the maximum number of repetitions of a PDCCH for scheduling paging, the maximum number of repetitions of a wakeup signal for scheduling paging, the time-frequency position of the wakeup signal for scheduling paging, a paging cycle, or the number nB of paging resources in the paging cycle.

For example, the corresponding paging parameter includes configuration information for scheduling paging, and the configuration information for scheduling paging may include at least one of a paging cycle (for example, a paging DRX cycle), the number nB of paging occasions in the paging cycle (that is, the number of paging resources in the paging cycle), the maximum number of repetitions of a PDCCH for scheduling paging, the maximum number of repetitions of a wakeup signal for scheduling paging, or the time-frequency position of the wakeup signal for scheduling paging.

If the paging cycle is included in the configuration information about carrying paging, the value of the paging cycle of the UE is the included paging cycle; otherwise, the value of the paging cycle of the UE is the paging cycle of the legacy UE, that is, the paging cycle configured according to the maximum cell coverage area.

If the number nB of paging occasions in the paging cycle is included in the configuration information about carrying paging, the value of the number nB of paging occasions in the paging cycle of the UE is the included number nB of paging occasions in the paging cycle; otherwise, the value of the number nB of paging occasions in the paging cycle of the UE is the number nB of paging occasions in the paging cycle of the legacy UE, that is, the number nB of paging occasions in the paging cycle configured according to the maximum cell coverage area.

If at least one of the maximum number of repetitions of a PDCCH for scheduling paging or the maximum number of repetitions of a wakeup signal for scheduling paging is included in the configuration information about carrying paging, the value of at least one of the maximum number of repetitions of a PDCCH for scheduling paging or the maximum number of repetitions of a wakeup signal for scheduling paging is the included at least one of the maximum number of repetitions of a PDCCH for scheduling paging or the maximum number of repetitions of a wakeup signal for scheduling paging; otherwise, the value of at least one of the maximum number of repetitions of a PDCCH for scheduling paging or the maximum number of repetitions of a wakeup signal for scheduling paging of the UE is at least one of the maximum number of repetitions of a PDCCH for scheduling paging or the maximum number of repetitions of a wakeup signal for scheduling paging of the legacy UE, that is, at least one of the maximum number of repetitions of a PDCCH for scheduling paging or the maximum number of repetitions of a wakeup signal for scheduling paging configured according to the maximum cell coverage area.

If the time-frequency position of the wakeup signal for scheduling paging is included in the configuration information about carrying paging, the value of the time-frequency position of the wakeup signal for scheduling paging of the UE is the included paging cycle; otherwise, the value of the time-frequency position of the wakeup signal for scheduling paging of the UE is the time-frequency position of the wakeup signal for scheduling paging of the legacy UE, that is, the time-frequency position of the wakeup signal for scheduling paging configured according to the maximum cell coverage area.

At least one of the maximum number of repetitions of a PDCCH for scheduling paging or the maximum number of repetitions of a wakeup signal for scheduling paging of an enhanced coverage restricted UE may be fixed at 1 (not repeatedly sent) according to a standard. If the standard is fixed at 1, at least one of the maximum number of repetitions of a PDCCH for scheduling paging or the maximum number of repetitions of a wakeup signal for scheduling paging of the enhanced coverage restricted UE is fixed at 1 and is not selected from the parameter information or from the paging parameter corresponding to the legacy UE.

In the solution provided in example three of embodiment two, in monitoring paging, the UE selects the corresponding paging resource according to the category of the UE and the received paging parameter. In this manner, UEs of different categories select paging resources according to different configuration information about carrying paging, thereby reducing power consumption while the UE is monitoring paging and improving the effect of energy saving.

Example Four

Figure 8:
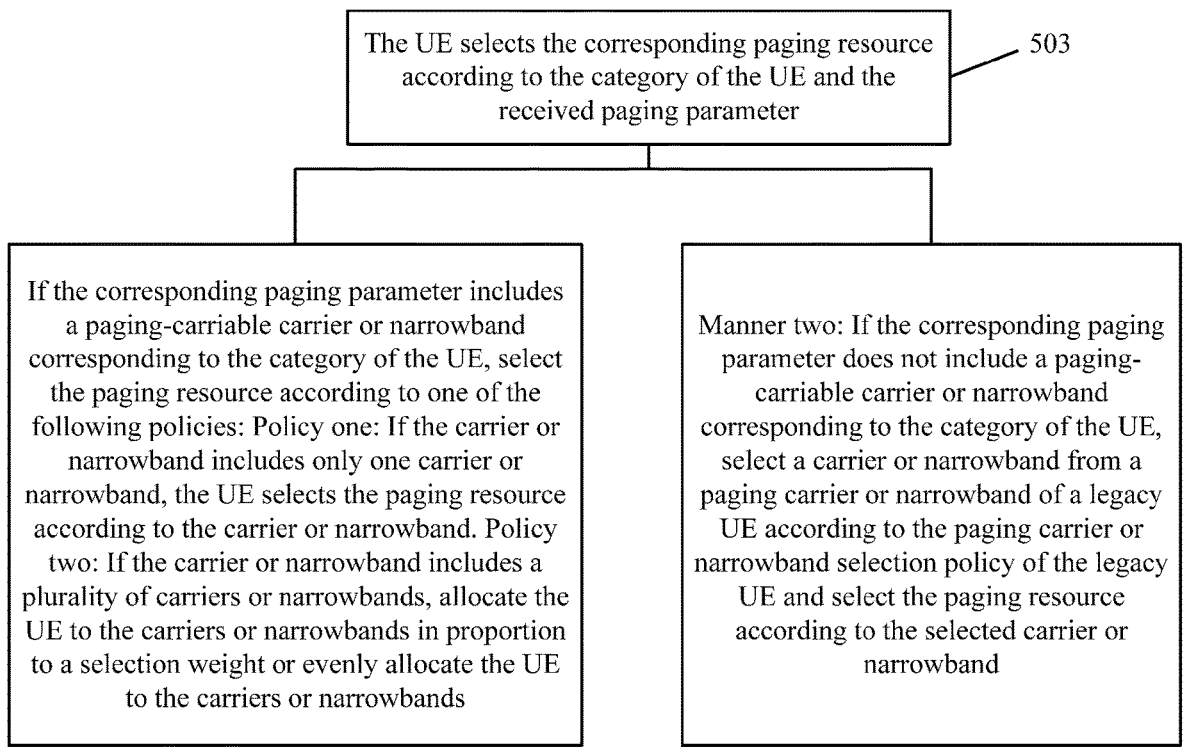
FIG. 8 is a schematic diagram illustrating the detailed process of step 503 of example one in the embodiment two of the present application.

FIG. 8 is a schematic diagram illustrating the detailed process of step 503 of example one in the embodiment two of the present application. As shown in FIG. 8, step 503 may include the manner one and manner two below.

Manner one: If the corresponding paging parameter includes a paging-carriable carrier or narrowband corresponding to the category of the UE, the paging resource is selected according to one of the policies below.

Policy one: If the carrier or narrowband includes only one carrier or narrowband, the UE selects the paging resource according to the carrier or narrowband.

Policy two: If the carrier or narrowband includes a plurality of carriers or narrowbands, the UE selects one carrier of the plurality of carriers or one narrowband of the plurality of narrowbands according to one of the predefined rules below and selects the paging resource according to the one carrier or the one narrowband.

Rule one: The UE is allocated to the carriers or narrowbands in proportion to a selection weight according to (i) a UE ID and a carrier selection weight or (ii) the UE ID and a narrowband selection weight.

Rule two: The UE is evenly allocated to the carriers or narrowbands after a modulus operation is performed on the UE ID and the number of the carriers or narrowbands.

Manner two: If the corresponding paging parameter does not include a paging-carriable carrier or narrowband corresponding to the category of the UE, a carrier or narrowband is selected from a paging carrier or narrowband of a legacy UE according to the paging carrier or narrowband selection policy of the legacy UE and the paging resource is selected according to the selected carrier or narrowband. The paging carrier or narrowband of the legacy UE is configured according to the maximum cell coverage area and the paging carrier or narrowband selection policy of the legacy UE is configured according to the maximum cell coverage area.

As regards how to select the carrier or narrowband for monitoring paging from the paging carrier or narrowband of the legacy UE according to the paging carrier or narrowband selection policy of the legacy UE, a related solution in a related standard may be used. The details are not repeated here.

In the solution provided in example four of embodiment two, in monitoring paging, the UE selects the corresponding paging resource according to the category of the UE and the received paging parameter. In this manner, UEs of different categories select paging resources according to different information about a downlink carrier for carrying paging, thereby reducing power consumption while the UE is monitoring paging and improving the effect of energy saving.

Example Five

Figure 9:
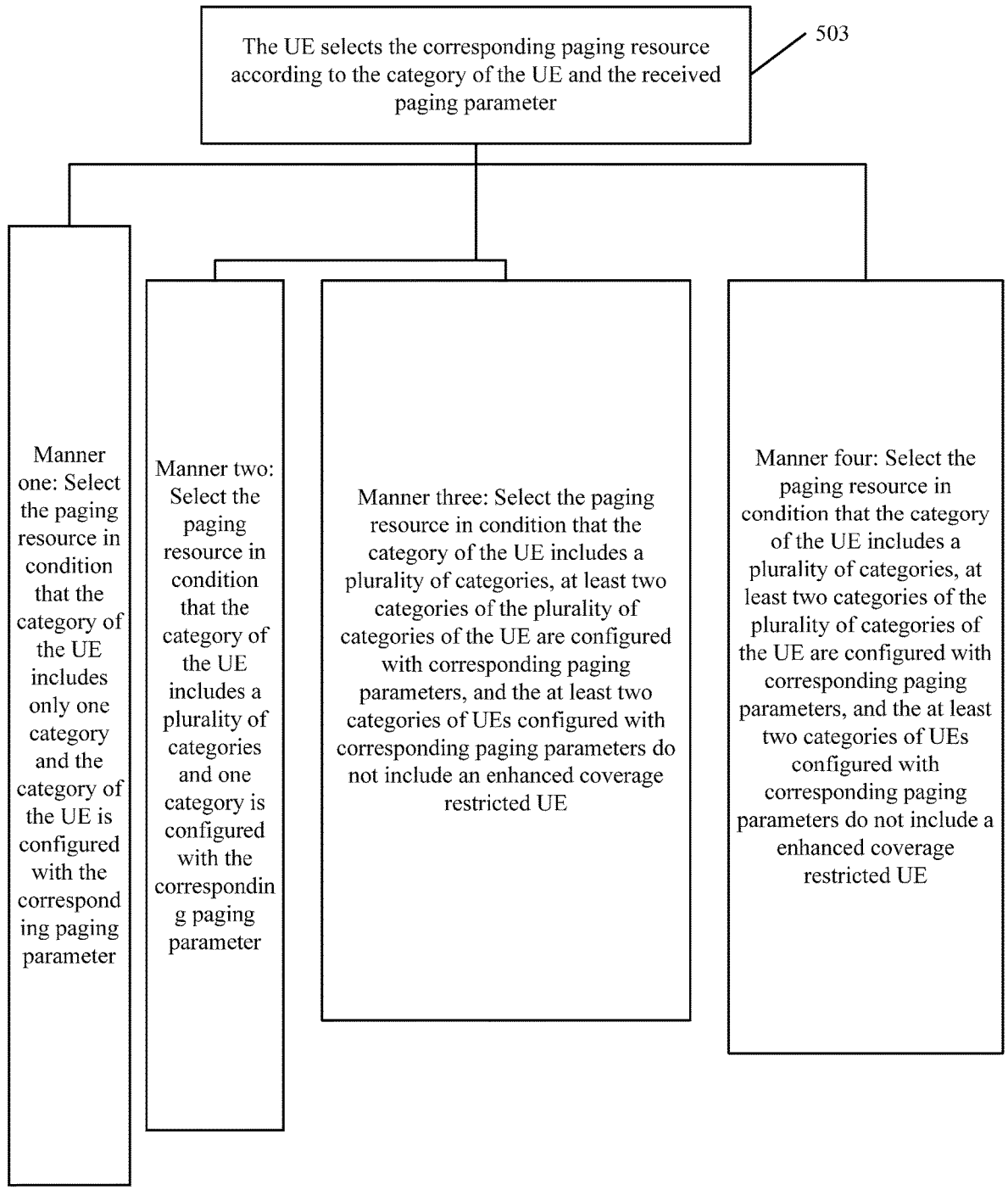
FIG. 9 is a schematic diagram illustrating the detailed process of step 503 of example one in the embodiment two of the present application.

FIG. 9 is a schematic diagram illustrating the detailed process of step 503 of example one in the embodiment two of the present application. As shown in FIG. 9, step 503 is performed in, for example, the four manners below.

The UE may select multiple paging resources according to multiple paging parameters and monitor paging messages on the multiple paging resources simultaneously.

Manner one: When the category of the UE includes only one category and the category of the UE is configured with the corresponding paging parameter, the UE selects the paging resource according to the corresponding paging parameter.

For example, if the UE is a CE-ModeB restricted UE or a UE at a low power level and the base station also has a paging parameter configured according to the CE-ModeB restricted UE or the UE at a low power level, then the category of the UE is consistent with the UE category corresponding to a set of paging parameters in the received paging parameters and the category of the UE is configured with a corresponding paging parameter. In this case, a corresponding paging resource is selected according to the paging parameter corresponding to the CE-ModeB restricted UE or the UE at a low power level.

Manner two: When the category of the UE includes a plurality of categories and these categories are each configured with a corresponding paging parameter, the UE selects multiple sets of paging parameters according to these categories, selects multiple sets of paging resources according to the multiple sets of paging parameters, and monitors paging messages on the multiple sets of paging resources simultaneously.

For example, if the UE includes a CE-ModeB restricted UE and a UE at a low power level and the base station also has paging parameters configured according to the CE-ModeB restricted UE and the UE at a low power level, then the categories of the UE are each consistent with the UE category corresponding to the respective one of two sets of paging parameters in the received paging parameters and multiple categories of the UE are each configured with a corresponding paging parameter. In this case, corresponding paging resources are selected according to the paging parameters corresponding to the CE-ModeB restricted UE and the UE at a low power level, and paging messages are monitored on the paging resources simultaneously.

Manner three: When the category of the UE includes a plurality of categories and multiple categories of the plurality of categories of the UE are configured with corresponding paging parameters, the UE selects paging resources by using the policy one or two below.

Policy one: The UE selects the paging resource according to a paging parameter corresponding to a UE category having the smallest coverage area among the categories of the UE configured with the corresponding paging parameter.

Policy two: The UE selects the paging resource according to a paging parameter corresponding to a UE category having the smallest maximum number of repetitions of a PDCCH or the smallest maximum number of repetitions of a wakeup signal among the categories of the UE configured with the paging parameter.

If the multiple categories of UEs configured with corresponding paging parameters do not include a enhanced coverage restricted UE, then another paging resource is selected according to the paging parameter corresponding to a legacy UE, and paging messages are monitored on the paging resource and the other paging resource simultaneously; or one or more other paging resources are selected according to the paging parameters corresponding to the multiple categories of the UE configured with corresponding paging parameters, and paging messages are monitored on the paging resource and the one or more other paging resources simultaneously.

For example, if the UE includes a CE-ModeB restricted UE and a UE at a low power level and the base station also has paging parameters configured according to the CE-ModeB restricted UE and the UE at a low power level, then the category of the UE is consistent with the UE category corresponding to a set of paging parameters in the received paging parameters and the category of the UE is configured with a corresponding paging parameter. In this case, a corresponding paging resource is selected according to the paging parameter corresponding to the CE-ModeB restricted UE or the UE at a low power level. Meanwhile, it is feasible to select another paging resource according to the paging parameter corresponding to the legacy UE and monitor paging messages on the paging resource and the other paging resource simultaneously. Alternatively, if the corresponding paging resource is selected according to the paging parameter corresponding to the CE-ModeB restricted UE, it is also feasible to select another corresponding paging resource according to the paging parameter corresponding to the UE at a low power level and monitor paging messages on the paging resource and the other paging resource simultaneously. It is preferable to select another paging resource according to the paging parameter corresponding to the UE at a low power level and monitor paging messages on the paging resource and the other paging resource simultaneously.

Manner four: When the category of the UE includes a plurality of categories and multiple categories of the plurality of categories of the UE are configured with corresponding paging parameters, the UE selects paging resources by using the policy one or two below.

Policy one: The UE selects the paging resource according to a paging parameter corresponding to a UE category having the smallest coverage area among the categories of the UE configured with the corresponding paging parameter.

Policy two: The UE selects the paging resource according to a paging parameter corresponding to a UE category having the smallest maximum number of repetitions of a PDCCH or the smallest maximum number of repetitions of a wakeup signal among the categories of the UE configured with the paging parameter. Moreover, if the multiple categories of UEs configured with corresponding paging parameters include a enhanced coverage restricted UE, it is also feasible to select one or more other paging resources according to the paging parameters corresponding to the multiple categories of the UE configured with corresponding paging parameters and monitor paging messages on the paging resource and the one or more other paging resources simultaneously.

For example, if the UE includes a CE-ModeB restricted UE and a UE at a low power level and the base station also has paging parameters configured according to the CE-ModeB restricted UE and the UE at a low power level, then the category of the UE is consistent with the UE category corresponding to a set of paging parameters in the received paging parameters and the category of the UE is configured with a corresponding paging parameter. In this case, a corresponding paging resource may be selected according to this policy, for example, according to the paging parameter corresponding to the CE-ModeB restricted UE or the UE at a low power level. Meanwhile, it is feasible to select another paging resource according to the paging parameter corresponding to the UE at a low power level and monitor paging messages on the paging resource and the other paging resource simultaneously.

For example, if the UE includes an enhanced coverage restricted UE, a CE-ModeB restricted UE and a UE at a low power level and the base station also has paging parameters configured according to the enhanced coverage restricted UE, the CE-ModeB restricted UE and the UE at a low power level, then the category of the UE is consistent with the UE category corresponding to a set of paging parameters in the received paging parameters and the category of the UE is configured with a corresponding paging parameter. In this case, a corresponding paging resource may be selected according to this policy, for example, according to the paging parameter corresponding to the enhanced coverage restricted UE. Meanwhile, it is feasible to select another paging resource according to the paging parameter corresponding to the UE at a low power level, to select yet another paging resource according to the paging parameter corresponding to the CE-ModeB restricted UE and to monitor paging messages on three paging resources: the paging resource, the another paging resource and the yet another paging resource simultaneously.

In the solution provided in example five of embodiment two, in monitoring paging, the UE selects the corresponding paging resource according to the category of the UE and the received paging parameter. In this manner, UEs of different categories can select multiple paging resources and monitor paging on the multiple paging resources simultaneously, thereby improving the accuracy in monitoring paging.

Embodiment Three

FIG. 10 is a flowchart of a paging method according to embodiment three of the present application. As shown in FIG. 10, the method includes step 1001.

In step 1001, a mobility management entity (MME) sends a paging message to a base station. The paging message carries UE category information of a to-be-paged UE.

The UE category information is used by the base station to identify the category of the to-be-paged UE.

The UE category information includes at least one of: UE power level information or UE category indication information.

The UE power level information includes UE maximum transmit power information.

The UE category indication information includes the category of the to-be-paged UE.

The category of the to-be-paged UE includes at least one of an enhanced coverage restricted UE, a coverage enhancement mode B (CE-ModeB) restricted UE, a UE at a low power level, or another UE having a feature restricting the UE coverage area.

Before the MME sends the paging message carrying the UE category information of the UE to the base station, the method further includes that the MME receives a message sent by the base station or the UE to carry the UE power level information or own feature information of the UE. Before the MME sends the paging message carrying the UE category information of the UE to the base station, the method further includes that the MME sends a message carrying the category of the UE to the UE.

The paging method provided in embodiment three of the present application includes that an MME sends a paging message to a base station. The paging message carries UE category information of a to-be-paged UE. In this manner, the base station acquires the category of the to-be-paged UE so that the base station can select a paging resource according to the category of the to-be-paged UE and a paging parameter configured by the base station according to the category of the UE, thereby reducing waste of resources during paging.

The solution provided in embodiment three is described in detail below through two examples. This embodiment is applicable to an eMTC or NB-IoT system. The base station (eNB) below may be an NB-IoT base station or an eMTC base station. The user equipment (UE) below may be an NB-IoT terminal or an eMTC terminal. The PDCCH below may be an NPDCCH or an MPDCCH.

Example One

FIG. 11 is a flowchart of a paging method according to example one in the embodiment three of the present application. As shown in FIG. 11, the method includes steps 1101, 1102 and 1103.

In step 1101, a base station or UE sends a message carrying UE power level information or own feature information of the UE to an MME.

The own feature information refers to whether coverage enhancement mode B (CE-ModeB) of the UE is restricted. For example, the UE sends the parameter "UE's usage setting" to the MME. If the parameter "UE's usage setting"

is set to "voice centric", CE-ModeB of the UE is restricted and the MME knows that the category of the UE includes a CE-ModeB restricted UE.

The UE power level information includes UE maximum transmit power information. The MME may also identify the category of the UE through the UE maximum transmit power information of the UE. For example, if the maximum uplink transmit power of the UE is 14 dBm, the MME can know that the category of the UE includes a UE at a low power level.

In step 1102, the MME sends a message carrying the category of the UE to the UE.

The category of the UE carried in this message is a UE category subscribed in the MME, for example, an enhanced coverage restricted UE.

In step 1103, the MME sends a paging message carrying the UE category information of the UE to the base station.

The UE category information is used by the base station to identify the category of the UE. The UE category information includes at least one of UE power level information or UE category indication information.

The sequence of step 1102 and step 1103 is not definite and is not limited by this example provided for ease of illustration only.

In the solution provided in this example one, the MME can acquire the UE power level information of the UE or the own feature information of the UE from the UE or the base station and send the UE category subscribed in the MME to the UE so that the UE can identify its own category; or the paging message sent by the MME to the base station carries the UE category information of the to-be-paged UE so that the base station can identify the UE category.

Example Two

FIG. 12 is a schematic diagram illustrating the detailed process of steps 1101 and 1102 of example one in the embodiment three of the present application. As shown in FIG. 12, steps 1101 and 1102 may include steps 1201 and 1202.

In step 1201, the UE reports the UE power level information or own feature information to the MME during access.

The UE may carry the UE power level information, for example, UE maximum transmit power information, in the ATTACH REQUES message or the TRACKING AREA UPDATE REQUEST message sent to the MME.

In step 1202, the MME sends a message carrying the category of the UE to the UE.

The MME may carry the UE category in the ATTACH REQUES message or the TRACKING AREA UPDATE REQUEST message sent to the UE.

The category of the UE may be a UE category subscribed in the MME, for example, an enhanced coverage restricted UE.

In the solution provided in this example two, the MME can acquire the UE power level information of the UE or the own feature information of the UE from the UE and send the UE category subscribed in the MME to the UE so that the UE can identify its own category.

Example Three

Figure 13:
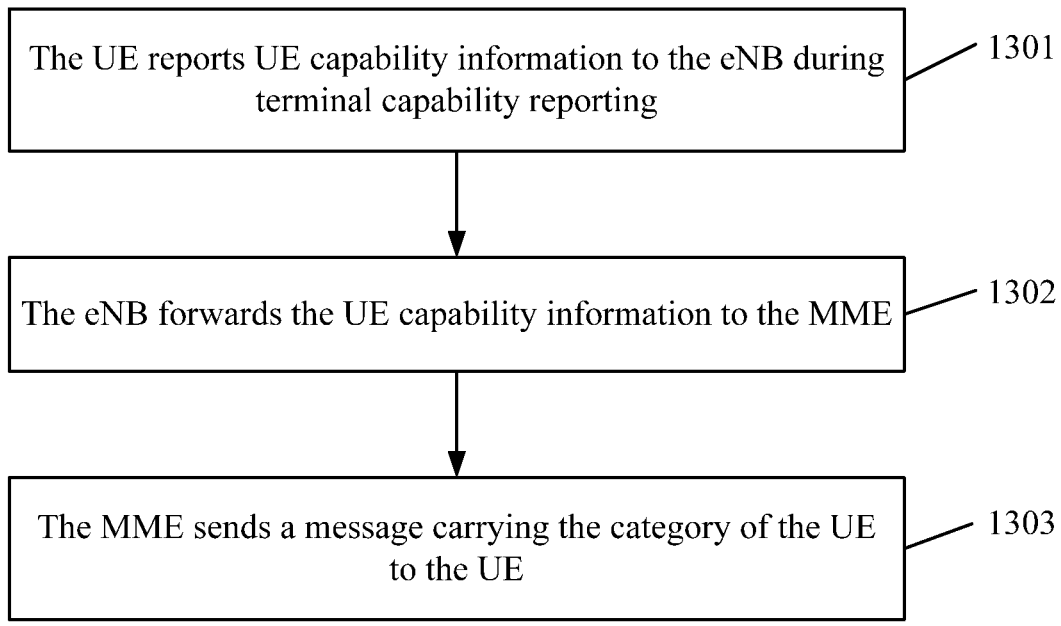
FIG. 13 is a schematic diagram illustrating the detailed process of step 1001 of example one in the embodiment three of the present application.

FIG. 13 is a schematic diagram illustrating the detailed process of step 1101 of example one in the embodiment three of the present application. As shown in FIG. 13, the method includes steps 1301, 1302 and 1303.

In step 1301, the UE reports UE capability information to the eNB during terminal capability reporting.

The UE may carry the UE power level information or own feature information in the UE capability information sent to the eNB.

In step 1302, the eNB forwards the UE capability information to the MME.

In step 1303, the MME sends a message carrying the category of the UE to the UE. The category of the UE may be a UE category subscribed in the MME, for example, a enhanced coverage restricted UE.

In the solution provided in this example two, the MME can acquire the UE power level information of the UE or the own feature information of the UE from the UE or the base station and send the UE category subscribed in the MME to the UE so that the UE can identify its own category.

Figure 14:
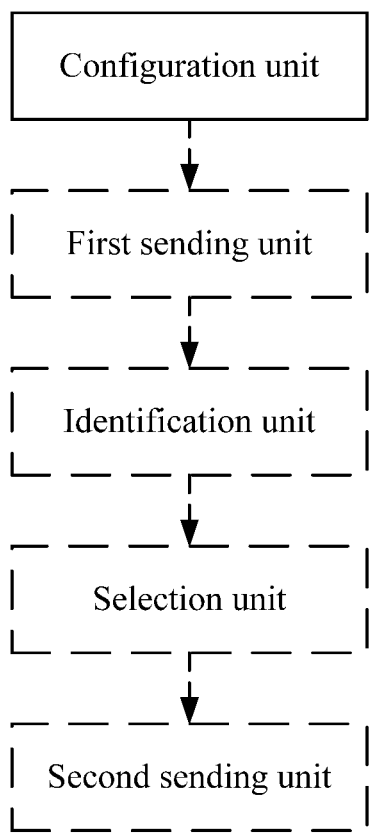
FIG. 14 is a structural diagram of a base station according to an embodiment of the present application.

An embodiment of the present application provides a base station. FIG. 14 is a structural diagram of the base station according to this embodiment of the present application. As shown in FIG. 14, the base station includes a configuration unit, a first sending unit, a selection unit, an identification unit and a second sending unit.

The configuration unit is configured to configure a paging parameter according to a user equipment (UE) category. The paging parameter includes at least one of configuration information for scheduling paging or information about a downlink carrier for carrying paging.

The base station further includes a first sending unit.

The first sending unit is configured to send the paging parameter configured according to the UE category to a UE through a system information block (SIB).

The base station further includes a selection unit and a second sending unit.

The selection unit is configured to select a corresponding paging resource according to the category of the to-be-paged UE and the configured paging parameter after the base station configures the paging parameter according to the UE category.

The second sending unit is configured to send a paging message to the to-be-paged UE on the paging resource.

The base station further includes an identification unit.

The identification unit is configured to identify the category of the UE according to UE category information of the UE carried in a paging message sent by a mobility management entity (MME). The UE category information includes at least one of UE power level information or UE category indication information.

Figure 15:
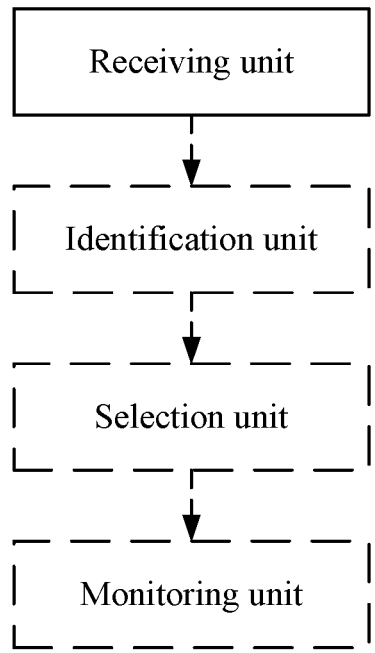
FIG. 15 is a structural diagram of a UE according to an embodiment of the present application.

An embodiment of the present application provides a user equipment (UE). FIG. 15 is a structural diagram of the UE according to this embodiment of the present application. As shown in FIG. 15, the UE includes a receiving unit, a selection unit, a monitoring unit and an identification unit. The receiving unit is configured to receive a paging parameter configured according to a UE category and sent by a base station.

The paging parameter includes at least one of configuration information for scheduling paging or information about a downlink carrier for carrying paging.

The UE further includes a selection unit and a monitoring unit.

The selection unit is configured to select a corresponding paging resource according to the category of the UE and the received paging parameter after the UE receives the paging parameter configured according to the UE category and sent by the base station.

The monitoring unit is configured to monitor a paging message on the paging resource.

The UE further includes an identification unit.

The identification unit is configured to, before the UE selects the corresponding paging resource according to the category of the UE and the received paging parameter, identify the category of the UE according to UE power level information or own feature information of the UE or identify the category of the UE according to a UE category carried in a message present by a mobility management entity (MME). The own feature information refers to whether coverage enhancement mode B (CE-ModeB) of the UE is restricted, and if the CE-ModeB of the UE is restricted, the category of the UE includes a CE-ModeB restricted UE.

Figure 16:
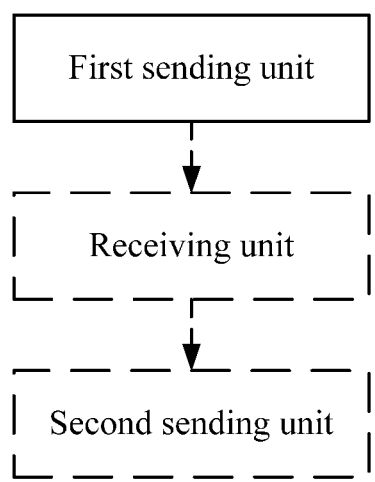
FIG. 16 is a structural diagram of an MME according to an embodiment of the present application.

An embodiment of the present application provides a mobility management entity (MME). FIG. 16 is a structural diagram of the MME according to this embodiment of the present application. As shown in FIG. 16, the MME includes a first sending unit, a receiving unit and a second sending unit.

The first sending unit is configured to send a paging message to a base station. The paging message carries UE category information of a to-be-paged UE.

The UE category information is used by the base station to identify the category of the UE.

The UE category information includes at least one of UE power level information or UE category indication information.

The MME further includes a receiving unit.

The receiving unit is configured to, before the MME sends the paging message carrying the UE category information of the UE to the base station, receive a message sent by the base station or the UE to carry the UE power level information or own feature information of the UE.

The MME further includes a second sending unit.

The second sending unit is configured to send a message carrying the category of the UE to the UE before the MME sends the paging message carrying the UE category information of the UE to the base station.

In the preceding embodiments one and two, a paging resource is selected according to a paging parameter, specifically the position of the paging resource such as a paging frame or a paging subframe is calculated according to a UE ID and a parameter item such as a paging cycle included in the paging parameter or the number nB of paging resources in the paging cycle included in the paging parameter, and then a paging message is sent or monitored according to the calculated position of the paging resource. As regards the process of how to select the paging resource and how a base station performs paging according to the paging resource or a UE monitors paging according to the paging resource, a related solution in a related standard may be used. The details are not repeated here.

An embodiment of the present application provides a base station. The base station includes a memory, a processor, and a computer program stored in the memory and executable by the processor. When the computer program is executed by the processor, any one of the preceding paging methods performed by the preceding base station is performed.

An embodiment of the present application provides a user equipment (UE). The UE includes a memory, a processor, and a computer program stored in the memory and executable by the processor. When the computer program is executed by the processor, any one of the preceding paging methods performed by the preceding UE is performed.

An embodiment of the present application provides a mobility management entity (MME). The MME includes a memory, a processor, and a computer program stored in the memory and executable by the processor. When the computer program is executed by the processor, any one of the preceding paging methods performed by the preceding MME is performed.

An embodiment of the present application provides a computer-readable storage medium storing an information processing program. When the information processing program is executed by a processor, any one of the preceding paging methods is performed.

It is to be understood by those of ordinary skill in the art that all or some of the steps and systems in the methods disclosed herein and all or some of the function modules/units in the apparatuses disclosed herein may be implemented as software, firmware, hardware or a suitable combination thereof. In a hardware implementation, the division of the function modules/units described above does not necessarily correspond to the division of physical components. For example, one physical component may have multiple functions, or one function or step may be implemented by several physical components cooperatively. Some or all of the components may be implemented as software executed by a processor such as a digital signal processor or a microprocessor, may be implemented as hardware, or may be implemented as an integrated circuit such as an application-specific integrated circuit. Such software may be distributed over computer-readable media. The computer-readable media may include computer storage media (or non-transitory media) and communication media (or transitory media). As is known to those of ordinary skill in the art, the term computer storage media include volatile and non-volatile as well as removable and non-removable media implemented in any method or technology for storing information (such as computer-readable instructions, data structures, program modules or other data). The computer storage media include, but are not limited to, a random-access memory (RAM), a read-only memory (ROM), an electrically erasable programmable read-only memory (EEPROM), a flash memory or other memory technologies, a compact disc read-only memory (CD-ROM), a digital versatile disc (DVD) or other optical storages, a magnetic cassette, a magnetic tape, a magnetic disk or other magnetic storage devices, or any other medium for storing desired information that can be accessed by a computer. Moreover, it is known to those skilled in the art that communication media typically include computer-readable instructions, data structures, program modules or other data in a modulated data signal, such as a carrier wave or other transport mechanisms, and may include any information delivery medium.

What is claimed is:

1. A paging method, comprising:
configuring, by a base station, a paging parameter according to a user equipment (UE) category, wherein the paging parameter comprises at least one of: configuration information for scheduling paging or information about a downlink carrier for carrying the paging;
wherein the paging method further comprises: sending, by the base station, the paging parameter configured according to the UE category to a UE through a system information block (SIB);
wherein the sending, by the base station, the paging parameter configured according to the UE category to the UE through the SIB comprises:
broadcasting, by the base station, the paging parameter configured according to the UE category and a correspondence between the UE category and the paging parameter to the UE through the SIB;
wherein the information about the downlink carrier for carrying the paging comprises at least one of: a list of narrowbands capable of carrying the paging, a UE selection weight of a paging carrier, a UE selection weight of a paging narrowband, or a number of paging narrowbands;

wherein after the configuring, by the base station, the paging parameter according to the UE category, the method further comprises:

selecting, by the base station, a paging resource according to a category of a to-be-paged UE and the configured paging parameter and sending, on the paging resource by the base station, a paging message to the to-be-paged UE;

wherein before the selecting, by the base station, the paging resource according to the category of the to-be-paged UE and the configured paging parameter, the method further comprises:

identifying, by the base station, the UE category of the to-be-paged UE according to UE category information of the to-be-paged UE carried in a paging message sent by a mobility management entity (MME) or identifying, by the base station, the UE category of the to-be-paged UE according to UE power level information or own feature information carried in UE capability information reported by the UE;

wherein the UE category information comprises at least one of the UE power level information or UE category indication information, the own feature information refers to whether coverage enhancement mode B (CE-ModeB) of the UE is restricted, and in response to the CE-ModeB of the UE being restricted, the category of the UE comprises a CE-ModeB restricted UE.

2. The method of claim 1, wherein
the UE category comprises at least one of: an enhanced coverage restricted UE, the CE-ModeB restricted UE, a UE at a low power level, a mobility restricted UE, a UE at a particular coverage enhancement level, or another UE having a feature restricting a UE coverage area.

3. The method of claim 1, wherein
the configuration information for scheduling the paging comprises at least one of: a maximum number of repetitions of a physical downlink control channel (PDCCH), a maximum number of repetitions of a wakeup signal for scheduling the paging, a time-frequency position of the wakeup signal for scheduling the paging, a paging cycle, or a number nB of paging resources in the paging cycle.

4. The method of claim 1, wherein the selecting, by the base station, the paging resource according to the category of the to-be-paged UE and the configured paging parameter comprises:

in response to determining that the category of the to-be-paged UE is configured with the paging parameter, selecting the paging resource according to the paging parameter; or in response to determining that the category of the to-be-paged UE is not configured with the paging parameter, selecting the paging resource according to a paging parameter corresponding to a legacy UE or according to a paging parameter that is among the configured paging parameter and that corresponds to a UE category having a coverage area greater than or equal to a smallest coverage area among the category of the to-be-paged UE, wherein the paging parameter corresponding to the legacy UE is configured according to a maximum cell coverage area.

5. A paging method, comprising:
receiving, by a user equipment (UE), a paging parameter configured according to a UE category and sent by a base station, wherein the paging parameter comprises at least one of: configuration information for scheduling paging or information about a downlink carrier for carrying the paging;

the UE category and a correspondence between the UE category and the paging parameter are received by the UE through a system information block (SIB);

wherein the information about the downlink carrier for carrying the paging comprises at least one of: a list of narrowbands capable of carrying the paging, a UE selection weight of a paging carrier, a UE selection weight of a paging narrowband, or a number of paging narrowbands;

wherein after the receiving, by the UE, the paging parameter configured according to the UE category and sent by the base station, the method further comprises:

selecting, by the UE, a paging resource according to a category of the UE and the received paging parameter and monitoring, on the paging resource by the UE, a paging message;

wherein the selecting, by the UE, the paging resource according to the category of the UE and the received paging parameter, the method further comprises:

identifying, by the UE, the category of the UE according to UE power level information or own feature information of the UE or identifying, by the UE, the category of the UE according to a UE category carried in a message present by a mobility management entity (MME), wherein the own feature information refers to whether coverage enhancement mode B (CE-ModeB) of the UE is restricted, and in response to the CE-ModeB of the UE being restricted, the category of the UE comprises a CE-ModeB restricted UE.

6. The method of claim 5, wherein
the UE category comprises at least one of an enhanced coverage restricted UE, the CE-ModeB restricted UE, a UE at a low power level, a mobility restricted UE, a UE at a particular coverage enhancement level, or another UE having a feature restricting a UE coverage area.

7. The method of claim 5, wherein
the configuration information for scheduling the paging comprises at least one of: a maximum number of repetitions of a physical downlink control channel (PDCCH), a maximum number of repetitions of a wakeup signal for scheduling the paging, a time-frequency position of the wakeup signal for scheduling the paging, a paging cycle, or a number nB of paging resources in the paging cycle.

8. The method of claim 5, wherein selecting, by the UE, the paging resource according to the category of the UE and the received paging parameter comprises:

in response to determining that the category of the UE is configured with the paging parameter, selecting the paging resource according to the paging parameter; or in response to determining that the category of the UE is not configured with the paging parameter, selecting the paging resource according to a paging parameter corresponding to a legacy UE or according to a paging parameter that is among the configured paging parameter and that corresponds to a UE category having a coverage area greater than or equal to a smallest coverage area among the category of the UE, wherein the paging parameter corresponding to the legacy UE is configured according to a maximum cell coverage area.

9. The method of claim 8, wherein the selecting the paging resource according to the paging parameter comprises:
  in response to determining that a parameter item is configured in the paging parameter, selecting the paging resource according to the configured parameter item; and
  in response to determining that no parameter item is configured in the paging parameter, selecting the paging resource according to a parameter item corresponding to a legacy UE, wherein the parameter item corresponding to the legacy UE is configured according to a maximum cell coverage area, wherein
  the parameter item comprises at least one of a maximum number of repetitions of a physical downlink control channel (PDCCH), a maximum number of repetitions of a wakeup signal for scheduling the paging, a paging cycle, or a number nB of paging resources in the paging cycle.

10. The method of claim 8, wherein selecting the paging resource according to the paging parameter comprises:
  in response to determining that the corresponding paging parameter does not comprise a paging-carriable carrier or narrowband corresponding to the category of the UE, selecting a carrier or narrowband from a paging carrier or narrowband of the legacy UE according to a paging carrier or narrowband selection policy of the legacy UE and selecting the paging resource according to the selected carrier or narrowband, wherein the paging carrier or narrowband of the legacy UE is configured according to the maximum cell coverage area and the paging carrier or narrowband selection policy of the legacy UE is configured according to the maximum cell coverage area.

11. A base station, comprising a memory, a processor, and a computer program stored in the memory and executable by the processor, wherein when the computer program is executed by the processor, the paging method of claim 1 is performed.

12. A user equipment (UE), comprising a memory, a processor, and a computer program stored in the memory and executable by the processor, wherein when the computer program is executed by the processor, the paging method of claim 5 is performed.

* * * * *